US012709193B2

(12) United States Patent
Xu et al.

(10) Patent No.: US 12,709,193 B2
(45) Date of Patent: Aug. 18, 2026

(54) METHOD FOR PULSE HEATING POWER BATTERY OF ELECTRIC VEHICLE AND ELECTRIC VEHICLE

(71) Applicant: Huawei Digital Power Technologies Co., Ltd., Shenzhen (CN)

(72) Inventors: Yankun Xu, Xi'an (CN); Sen Cao, Xi'an (CN); Yang Cheng, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 4 days.

(21) Appl. No.: 18/780,790

(22) Filed: Jul. 23, 2024

(65) Prior Publication Data

US 2025/0042306 A1 Feb. 6, 2025

(30) Foreign Application Priority Data

Jul. 31, 2023 (CN) ......................... 202310962386.3
Nov. 8, 2023 (CN) ......................... 202311487433.X

(51) Int. Cl.

| | |
|---|---|
| ***B60L 58/27*** | (2019.01) |
| ***B60L 15/20*** | (2006.01) |
| ***H01M 10/615*** | (2014.01) |
| ***H01M 10/625*** | (2014.01) |
| ***H01M 10/637*** | (2014.01) |

(52) U.S. Cl.
CPC ............... *B60L 58/27* (2019.02); *B60L 15/20* (2013.01); *H01M 10/615* (2015.04); *H01M 10/625* (2015.04); *H01M 10/637* (2015.04); *H01M 2220/20* (2013.01)

(58) Field of Classification Search
CPC .......... B60L 58/27; B60L 58/25; B60L 15/20; B60L 15/08; H01M 10/615; H01M 10/625; H01M 10/637
See application file for complete search history.

(56) References Cited

U.S. PATENT DOCUMENTS

2012/0277058 A1* 11/2012 Ishikawa ................ B60L 50/15
477/3
2022/0169147 A1* 6/2022 Huang .................... B60L 58/27
2023/0097060 A1* 3/2023 Ling ...................... B60L 15/20
318/139

(Continued)

FOREIGN PATENT DOCUMENTS

| | | |
|---|---|---|
| CN | 115782696 A | 3/2023 |
| CN | 116438698 A | 7/2023 |
| EP | 4151459 A1 | 3/2023 |

*Primary Examiner* — Tan Q Nguyen
(74) *Attorney, Agent, or Firm* — Maier & Maier, PLLC

(57) ABSTRACT

A method for pulse heating a power battery of an electric vehicle and an electric vehicle. A powertrain includes a first power circuit and a second power circuit. The method is used to control the second power circuit or a motor power circuit to generate a pulse alternating current on a direct current bus, and the pulse alternating current is used to heat the power battery. A phase value of a pulse alternating current output by at least one of the first power circuit and the second power circuit is adjusted, to reduce a phase difference between a pulse alternating current generated by the first power circuit and a pulse alternating current generated by the second power circuit, thereby improving heating efficiency of the power battery.

17 Claims, 20 Drawing Sheets

(56) References Cited

U.S. PATENT DOCUMENTS

| | | | | |
|---|---|---|---|---|
| 2023/0163378 | A1* | 5/2023 | Wang | H01M 10/425<br>318/139 |
| 2024/0186928 | A1* | 6/2024 | Huang | H02P 21/22 |
| 2024/0250332 | A1* | 7/2024 | Chen | H02J 7/0063 |

* cited by examiner

METHOD FOR PULSE HEATING POWER BATTERY OF ELECTRIC VEHICLE AND ELECTRIC VEHICLE

CROSS-REFERENCE TO RELATED APPLICATIONS

This application claims priority to Chinese Patent Application No. 202311487433.X, filed on Nov. 8, 2023 and Chinese Patent Application No. 202310962386.3, filed on Jul. 31, 2023. Both of the aforementioned applications are hereby incorporated by reference in their entireties.

TECHNICAL FIELD

The embodiments relate to the field of electric vehicles, and to a method for pulse heating a power battery of an electric vehicle, and an electric vehicle.

BACKGROUND

With the increasing prominence of energy and environmental issues in recent years, a vehicle using fuel as energy is subject to specific restrictions and impact. An electric vehicle uses a power battery as a power source. Compared with the conventional fuel vehicle, the electric vehicle has many advantages such as energy saving, low pollution, and high efficiency, and therefore is rapidly developing in recent years.

In a low-temperature environment, charge and discharge capabilities of the power battery of the electric vehicle decreases sharply. Therefore, the power battery needs to be heated, so that the electric vehicle travels normally. Currently, a common heating manner includes a plurality of heating manners such as a positive temperature coefficient (PTC) heating mode and active heating of a motor. In the foregoing heating manners, the battery is heated by heating a water pipe, and a heating rate is not high. This affects user experience.

In addition, the power battery may alternatively be heated through high frequency pulse heating. A powertrain can perform alternating current high frequency charging and discharging on the power battery, to heat the battery by using heat generated by internal resistance of the battery. Performing heating by using a single power circuit in the powertrain is limited by hardware like as a motor winding and a bus capacitor, and an adjustable range of a pulse alternating current generated by the power circuit is limited, and therefore the heating rate of the power battery is limited. However, when a plurality of power circuits are used for heating, because there is a large phase difference between pulse alternating currents flowing into the battery, the pulse alternating currents may counteract each other and affect the heating rate.

SUMMARY

The embodiments provide a method for pulse heating a power battery of an electric vehicle and an electric vehicle, to improve heating efficiency of the power battery and improve driving experience of a user.

According to a first aspect, the embodiments provide a method for pulse heating a power battery of an electric vehicle, where the electric vehicle includes a first powertrain and a second powertrain, the first powertrain is configured to be in transmission connection with two front wheels of the electric vehicle, the second powertrain is configured to be in transmission connection with two rear wheels of the electric vehicle, the first powertrain includes a first motor controller and a first drive motor, the second powertrain includes a second motor controller and a second drive motor, the first motor controller includes a first power circuit and a first bus capacitor, and the second motor controller includes a second power circuit and a second bus capacitor; the first power circuit includes a first three-phase bridge arm, two ends of each bridge arm of the first three-phase bridge arm are respectively configured to connect two ends of the first bus capacitor, the second power circuit includes a second three-phase bridge arm, two ends of each bridge arm of the second three-phase bridge arm are respectively configured to connect two ends of the second bus capacitor, and the method includes:

in response to that a temperature of the power battery is less than a first preset temperature, controlling one of the first power circuit and the second power circuit to output a three-phase current; and in response to that the temperature of the power battery is less than a second preset temperature, controlling both the first power circuit and the second power circuit to output the three-phase current, where the second preset temperature is less than the first preset temperature.

The three-phase current is used to generate a pulse alternating current on the direct current bus, and the pulse alternating current is used to heat the power battery.

The method provided in the embodiments may be used for pulse heating the power battery. In a process of pulse heating the power battery, according to the method provided in the embodiments, one power circuit may be selected based on a temperature of the power battery to generate a pulse alternating current, or two power circuits may simultaneously generate pulse alternating currents. If the temperature of the battery is high, the one power circuit may be used to generate the pulse alternating current to heat the power battery. If the temperature of the battery is low, the two power circuits may be used to generate the pulse alternating currents to heat the power battery with higher heating power.

When there is a large phase difference between the pulse alternating currents flowing into the power battery, a direction and intensity may affect each other. If the two pulse alternating currents have opposite directions or amplitudes, the two pulse alternating currents counteract each other, thereby seriously affecting heating efficiency of the power battery. Therefore, a phase value of a pulse alternating current output by at least one of the first power circuit and the second power circuit is adjusted, to reduce a phase difference between a pulse alternating current generated by the first power circuit and a pulse alternating current generated by the second power circuit, thereby improving the heating efficiency of the power battery.

Because the phase difference between the pulse alternating current generated by the first power circuit and the pulse alternating current generated by the second power circuit is excessively small and is difficult to be measured, and has limited impact on the heating efficiency, in a possible implementation, the method includes: in response to that a phase difference between a pulse alternating current generated by the first power circuit and a pulse alternating current generated by the second power circuit is greater than a preset value, adjusting a switching frequency of a switching transistor of the first power circuit or a switching frequency of a switching transistor of the second power circuit to reduce the phase difference between the pulse alternating current output by the first power circuit and the pulse alternating current output by the second power circuit.

When a small phase difference exists between the pulse alternating current generated by the first power circuit and the pulse alternating current generated by the second power circuit, a direction and strength of the pulse alternating current flowing into the power battery are not greatly affected. However, when the phase difference between the pulse alternating current generated by the first power circuit and the pulse alternating current generated by the second power circuit is greater than the preset value, cancellation exists. Therefore, in this case, a switching frequency of a switching transistor of any one of the first power circuit and the second power circuit is adjusted, to reduce the phase difference between the pulse alternating current of the first power circuit and the pulse alternating current of the second power circuit, to improve the heating efficiency of the power battery.

In a possible implementation, the method includes: in response to that the phase difference between the pulse alternating current generated by the first power circuit and the pulse alternating current generated by the second power circuit on a direct current bus is greater than the preset value, controlling the first power circuit to generate the pulse alternating current first, and controlling the second power circuit to generate the pulse alternating current later; or controlling the second power circuit to generate the pulse alternating current first, and controlling the first power circuit to generate the pulse alternating current later.

A sequence of generating the pulse alternating current is adjusted, so that the phase difference output by the first power circuit and the second power circuit is reduced, thereby improving the heating efficiency of the power battery.

In a possible implementation, in a charging and discharging process of the power battery, bridge arm midpoints of three-phase bridge arms of the first power circuit and the second power circuit are configured to respectively output a three-phase current. The three-phase current is used to generate the pulse alternating current on the direct current bus, and the three-phase current includes a U-phase current, a V-phase current, and a W-phase current. The method includes: in response to that a phase difference between the U-phase current, the V-phase current, or the W-phase current respectively output by the first power circuit and the second power circuit is greater than a preset value, adjusting the switching frequency of the switching transistor of the first power circuit or the switching frequency of the switching transistor of the second power circuit, to reduce a phase difference between the U-phase current, the V-phase current, and the W-phase current respectively output by the first power circuit and the second power circuit.

Because frequencies of the three-phase current and the pulse alternating current are the same, whether the phase difference between the pulse alternating currents generated by the two three-phase bridge arms is greater than the preset value may also be determined by detecting a phase difference of in-phase currents corresponding to the two three-phase bridge arms. When the phase difference of the phase currents output by the two three-phase bridge arms is greater than the preset value, a switching frequency of a switching transistor of at least one of the any two three-phase bridge arms may be adjusted to reduce the phase difference of the phase current output by the any two three-phase bridge arms, to improve the heating efficiency of the power battery.

In a possible implementation, the method includes: in response to that the phase difference between the U-phase current, the V-phase current, or the W-phase current respectively output by the first power circuit and the second power circuit is greater than the preset value, adjusting the switching frequency of the switching transistor of the first power circuit or the switching frequency of the switching transistor of the second power circuit, until the phase difference between the U-phase current, the V-phase current, or the W-phase current respectively output by the first power circuit and the second power circuit is not greater than the preset value.

The switching frequency of the switching transistor of the first power circuit or the switching frequency of the second power circuit is adjusted, so that the phase difference between the U-phase current, the V-phase current, or the W-phase current output by the first power circuit and the second power circuit is not greater than the preset value, thereby improving the heating efficiency of the power battery.

In a possible implementation, the method includes: in response to that the phase difference between the U-phase current, the V-phase current, or the W-phase current respectively output by the first power circuit and the second power circuit is not greater than the preset value, controlling the switching frequency of the switching transistor of the first power circuit and the switching frequency of the switching transistor of the second power circuit to be a specified frequency.

If it is determined that the phase difference between the U-phase current, the V-phase current, or the W-phase current respectively output by the first power circuit and the second power circuit is not greater than the preset value, the switching frequency of the switching transistor of the first power circuit and the switching frequency of the switching transistor of the second power circuit are controlled to be the specified frequency. In this way, a frequency of a direct axis current component of the three-phase current output by each three-phase bridge arm may be controlled to be a preset frequency. In this way, a phase difference is prevented from being generated again by the U-phase current, the V-phase current, or the W-phase current respectively output by the first power circuit and the second power circuit.

In a possible implementation, the method includes: in response to that the phase difference between the pulse alternating current generated by the first power circuit and the pulse alternating current generated by the second power circuit on the direct current bus is greater than the preset value, adjusting the switching frequency of the switching transistor of the first power circuit or the switching frequency of the switching transistor of the second power circuit, to reduce the phase difference between the pulse alternating current generated by the first power circuit and the pulse alternating current generated by the second power circuit.

In a possible implementation, the method includes: in response to that the phase difference between the pulse alternating current generated by the first power circuit and the pulse alternating current generated by the second power circuit on the direct current bus is greater than the preset value, controlling the switching frequency of the switching transistor of the first power circuit or the switching frequency of the switching transistor of the second power circuit until the phase difference between the pulse alternating current generated by the first power circuit and the pulse alternating current generated by the second power circuit on the direct current bus is not greater than the preset value.

The switching frequency of the switching transistor of the first power circuit or the switching frequency of the second power circuit is adjusted, so that the phase difference between the pulse alternating current generated by the first power circuit and the pulse alternating current generated by the second power circuit on the direct current bus is not greater than the preset value, thereby improving the heating efficiency of the power battery.

In a possible implementation, the method includes: in response to that the phase difference between the pulse alternating current generated by the first power circuit and the pulse alternating current generated by the second power circuit on the direct current bus is not greater than the preset value, controlling the switching frequency of the switching transistor of the first power circuit and the switching frequency of the switching transistor of the second power circuit to be the specified frequency.

If it is determined that the pulse alternating current generated by the first power circuit and the pulse alternating current generated by the second power circuit on the direct current bus is not greater than the preset value, the switching frequency of the switching transistor of the first power circuit and the switching frequency of the switching transistor of the second power circuit are controlled to be the specified frequency. In this way, the frequency of the direct axis current component of the three-phase current output by each three-phase bridge arm can be controlled to be the preset frequency, thereby avoiding that the pulse alternating current generated by the first power circuit and the pulse alternating current generated by the second power circuit on the direct current bus generate a phase difference again.

In a possible implementation, the three-phase current output by the first power circuit is a first three-phase current, the three-phase current output by the second power circuit is a second three-phase current, frequencies of currents of each phase of the first three-phase current are different in any two adjacent periods, and frequencies of currents of each phase of the second three-phase current are different in any two adjacent periods.

Because frequencies of the currents of each phase of the first drive motor/second power circuit are different in any two adjacent periods, it is equivalent that frequencies of currents of each phase flowing through a first drive motor winding/second drive motor winding are also different, and vibration frequencies generated by each winding under the action of a rapidly changing current are also different. If frequencies in any two adjacent periods are different, noise generated by the driving motor winding in the two adjacent periods also has at least two different frequencies. In addition, because time of each period is short, noise energy generated by vibration may be dispersed to a wide frequency range, to reduce noise perception on a specific frequency, thereby providing better user experience.

In a possible implementation, frequencies of the current of each phase of the first three-phase current in a first half period and a second half period in a same period are different, and frequencies of the current of each phase of the second three-phase current in a first half period and a second half period in a same period are different. In this manner, noise energy generated by vibration may be more evenly dispersed to a wider frequency range, thereby further reducing noise perception on a specific frequency.

In a possible implementation, a waveform of the current of each phase of the first three-phase current is a single-side triangular wave, and a waveform of the current of each phase of the second three-phase current is a single-side triangular wave. In a positive and negative period of the pulse alternating current, the single-side triangular wave can maximize energy stored and released by a three-phase winding inductor in this period. This effectively improves an effective value of a pulse heating current and heating power.

In a positive and negative period of the pulse alternating current, the single-side triangular wave can maximize energy stored and released by a three-phase winding inductor in this period. This effectively improves an effective value of a pulse heating current and heating power.

In a possible implementation, a waveform of a direct axis current of the first three-phase current is a square wave with direct current bias, and a waveform of a direct axis current of the second three-phase current is a square wave with direct current bias. Using the direct axis current with the direct current bias can improve effective values of three-phase currents of the first power circuit and the second power circuit, to improve the heating efficiency of the power battery.

In a possible implementation, a quadrature axis component of the first three-phase current is zero or a torque value of the first drive motor is less than a preset torque value. A quadrature axis component of the second three-phase current is zero or a torque value of the first drive motor is less than a preset torque value. This avoids unexpected torque output of the first drive motor and the second drive motor, thereby improving noise, vibration, and harshness (NVH) performance and driving comfort of the vehicle.

According to a second aspect, the embodiments provide an electric vehicle, where the electric vehicle includes a power battery, two front wheels, two rear wheels, a first powertrain, a second powertrain, and a vehicle controller, the first powertrain is configured to be in transmission connection with the two front wheels of the electric vehicle, the second powertrain is configured to be in transmission connection with the two rear wheels of the electric vehicle, the first powertrain includes a first motor controller and a first drive motor, the second powertrain includes a second motor controller and a second drive motor, the first motor controller includes a first power circuit and a first bus capacitor, and the second motor controller includes a second power circuit and a second bus capacitor; the first power circuit includes a first three-phase bridge arm, two ends of each bridge arm of the first three-phase bridge arm are respectively configured to connect two ends of the first bus capacitor, the second power circuit includes a second three-phase bridge arm, two ends of each bridge arm of the second three-phase bridge arm are respectively configured to connect two ends of the second bus capacitor, and the two ends of the first bus capacitor and the two ends of the second bus capacitor are separately configured to connect a positive electrode and a negative electrode of a power battery through a direct current bus; and the vehicle controller is configured to: control the first power circuit or the second power circuit to output a three-phase current, where the three-phase current is used to generate a pulse alternating current on the direct current bus, and the pulse alternating current is used to heat the power battery.

DETAILED DESCRIPTION OF EMBODIMENTS

Figure 1:
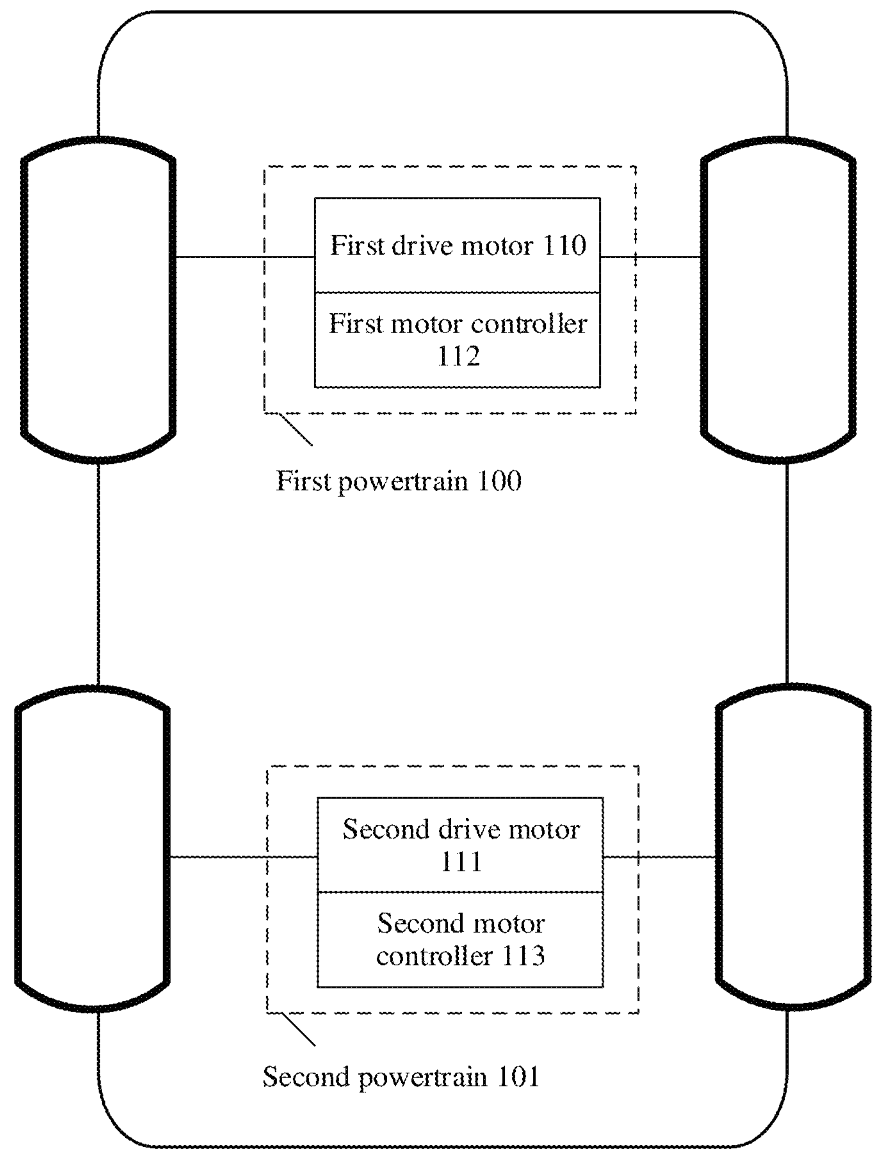
FIG. 1 is a diagram of a structure of an electric vehicle according to the embodiments.

To make the objectives, solutions, and advantages of the embodiments clearer, the following further describes the embodiments in detail with reference to the accompanying drawings. However, example embodiments may be implemented in a plurality of forms and should not be construed as being limited to embodiments described herein. On the contrary, these embodiments are provided such that descriptions are more comprehensive and complete, and fully convey the concept of the example embodiments to a person skilled in the art. Identical reference numerals in the accompanying drawings denote identical or similar structures. Therefore, repeated description thereof is omitted. Expressions of locations and directions in the embodiments are described by using the accompanying drawings as an example. However, changes may also be made as required, and all the changes fall within the scope of the embodiments. The accompanying drawings are merely used to illustrate relative position relationships and do not represent an actual scale.

To make the objectives, solutions, and advantages of the embodiments clearer, the following further describes the embodiments in detail with reference to the accompanying drawings. A specific operation method in a method embodiment may also be applied to an apparatus embodiment or a system embodiment. It should be noted that in descriptions of the embodiments, “at least one” means one or more, and “a plurality of” means two or more. In view of this, in embodiments, “a plurality of” may also be understood as “at least two”. The term “or” describes an association relationship for describing associated objects, and represents that three relationships may exist. For example, A and/or B may represent the following three cases: only A exists, both A and B exist, and only B exists. In addition, the character “/” generally indicates an “or” relationship between the associated objects. In addition, it should be understood that in description of the embodiments, terms such as “first” and “second” are merely used for distinguishing and description, but should not be understood as indicating or implying relative importance, or should not be understood as indicating or implying a sequence.

It should be noted that, “connection” in embodiments refers to an electrical connection, and a connection between two electrical elements may be a direct or indirect connection between the two electrical elements. For example, a connection between A and B may be a direct connection between A and B, or may be an indirect connection between A and B through one or more other electrical elements. For example, that A is connected to B may also be that A is directly connected to C, C is directly connected to B, A and B are connected through C.

FIG. 1 is a diagram of a structure of an electric vehicle according to the embodiments. As shown in FIG. 1, the electric vehicle 10 includes a first powertrain 100 and a second powertrain 101. The first powertrain 100 is configured to be in transmission connection with two front wheels of the electric vehicle 10, and the second powertrain 101 is configured to be in transmission connection with two rear wheels of the electric vehicle 10. The first powertrain 100 includes a first drive motor 110 and a first motor controller 112. The second powertrain 101 includes a second drive motor 111 and a second motor controller 113. A power battery is configured to output electric energy to the first drive motor 110 and the second drive motor 111, so that the first drive motor 110 and the second drive motor 111 rotate (output torque), to drive the electric vehicle 10. The first drive motor 110 and the second drive motor 111 are configured to provide power for the wheels under control of a control circuit to drive the electric vehicle. For example, the first drive motor 110 is a front drive motor 111, and is configured to provide power for the front wheels to drive the electric vehicle 10. The second drive motor 111 is a rear drive motor, and is configured to provide power for the rear wheels to drive the electric vehicle 10.

In some possible implementations, the first drive motor 110 is a permanent magnet synchronous motor, and the second drive motor 111 is an asynchronous motor. In this case, the first drive motor 110 is a primary drive motor, and the second drive motor 111 is a secondary drive motor. The second drive motor 111 may be in a non-working state. Alternatively, the first drive motor 110 is an asynchronous motor, and the second drive motor 111 is a permanent magnet synchronous motor. In this case, the first drive motor 110 is a secondary drive motor, and the second drive motor 111 is a primary drive motor. The first drive motor 110 may be in a non-working state. Alternatively, both the first drive motor 110 and the second drive motor 111 are permanent magnet synchronous motors. In this case, either of the first drive motor 110 and the second drive motor 111 may be selected as a primary drive motor, and the other one may be selected as a secondary drive motor. In addition, flexible switching between a front driving mode and a rear driving mode may be further implemented. For example, in the front driving mode, a motor responsible for front driving works independently, a motor responsible for rear driving does not work, and a rotor of the motor responsible for rear driving rotates. In this case, if the vehicle travels in, for example, a ramping state or an acceleration state, the vehicle may be switched to the rear driving mode. The motor responsible for rear driving works independently, the motor responsible for front driving does not work, and a rotor of the motor responsible for the front driving rotates, to improve power performance of the vehicle in a specific state.

A temperature has large impact on the power battery, and a lithium plating phenomenon occurs when the power battery is charged and discharged at a low temperature. This causes power battery capacity attenuation and even causes a power battery safety risk. Therefore, the electric vehicle is allowed to travel only after the power battery is first heated to a specific temperature.

Currently, several manners for heating the power battery can be used.

A manner for heating the power battery is heating the power battery by using an external heating system. For example, a power battery thermal loop is disposed outside the power battery, and the power battery thermal loop has a heat-carrying fluid that carries heat. A positive temperature coefficient (PTC) resistor heats the heat-carrying fluid in the power battery thermal loop. The heat-carrying fluid in the power battery thermal loop transfers heat to the power battery to heat the power battery. In the foregoing manner, the heat-carrying fluid in the power battery thermal loop needs to be first heated, and then the power battery is heated by using the heat-carrying fluid in the power battery thermal loop. Therefore, a heat transfer path is long, and heating efficiency is low.

A manner for heating the power battery is electric drive active heating. The electric drive active heating manner uses a motor excitation current to generate heat on a driving motor to heat the power battery. A motor controller outputs a three-phase alternating current to the drive motor, and the three-phase alternating current makes torque of the drive motor zero. An excitation current generates heat on a winding of the drive motor, and the heat generated on the drive motor is conducted to the power battery by using a heat conduction apparatus between the drive motor and the power battery for heating. In the foregoing manner, because heat of the drive motor needs to be conducted to the power battery through the heat conduction apparatus, the foregoing heating manner has disadvantages of a long heat transfer path, a low heating rate of the power battery, and low heating efficiency.

A manner for heating the power battery is high frequency pulse heating. The high frequency pulse heating manner uses a high frequency pulse alternating current generated by the motor controller to heat the power battery. A bridge arm circuit of the motor controller generates the high frequency pulse alternating current. The high frequency pulse alternating current generates heat on internal resistance of the power battery when passing through the power battery, to heat the power battery. The high frequency heating manner has an advantage of a high heating rate and is widely paid attention, but a current high frequency pulse heating manner has the problems of poor system robustness, low control precision and unexpected torque.

A motor of an electric vehicle is generally an alternating current motor, and a power battery is a direct current source. Therefore, a direct current output by the power battery is transformed into a three-phase alternating current of the motor through a three-phase bridge arm. Coordinate axes of the three-phase alternating current are: a U-axis, a V-axis, and a W-axis. Three phases of the alternating current may also be separately referred to as a U phase, a V phase, and a W phase. To simplify analysis of the motor, stationary three-phase coordinates can be transformed into rotating d-q coordinates. Such transformation is Park transformation (Park transformation). In a d-q coordinate system, three coordinate axes are separately referred to as a direct axis, a quadrature axis, and a zero axis.

The direct axis is also referred to as a D axis or a d-axis, and is a time-varying direct current coordinate axis that is obtained from a stationary U/V/W three-phase coordinate axis through Park transformation.

The quadrature axis is also referred to as a Q axis or a q-axis, and is a time-varying alternating current coordinate axis that is obtained from the stationary U/V/W three-phase coordinate axis through Park transformation.

The zero axis is also referred to as a 0 axis or a 0-axis, and is a coordinate axis that is perpendicular to a d-q plane on which the direct axis and the quadrature axis are located.

For example, a formula of Park transformation may be as follows:

$$\begin{bmatrix} I\_d \\ I\_q \\ I\_0 \end{bmatrix} = \frac{2}{3} \begin{bmatrix} \cos(\theta) & \cos(\theta - 2\pi/3) & \cos(\theta + 2\pi/3) \\ -\sin(\theta) & -\sin(\theta - 2\pi/3) & -\sin(\theta + 2\pi/3) \\ 1/2 & 1/2 & 1/2 \end{bmatrix} \begin{bmatrix} I\_u \\ I\_v \\ I\_w \end{bmatrix}$$

θ is an included angle between the d-axis and the U-axis. I_d is referred to as a direct axis current, and can be used to adjust a magnetic field. I_q is referred to as a quadrature axis current, and can be used to adjust torque. I_0 is referred to as a zero-sequence current. I_u, I_v, and I_w are respectively currents on the U-axis, the V-axis, and the W-axis, that is, a three-phase current.

The foregoing matrix is an expression for transforming the three-phase current into I_d, I_q, and I_0. An expression for transforming I_d, I_q, and I_0 into the three-phase current may be obtained through inverse transformation of the matrix transformation. Details are not described herein.

Because the three-phase current is a current corresponding to a real winding of the motor, when outputting a current to the direct axis of the motor, a motor controller needs to transform I_d into a three-phase current I_u, I_v, and I_w through inverse transformation of Park transformation, and input I_u, I_v, and I_w into the winding of the motor; or when outputting a current to the zero axis of the motor, a motor controller needs to transform I_0 into a three-phase current I_u, I_v, and I_w through inverse transformation of Park transformation, and input I_u, I_v, and I_w into the winding of the motor.

A quadrature axis voltage/current is used to control torque output by the motor, and a direct axis voltage/current is used to control a direction and magnitude of a magnetic field generated by the motor.

In a high frequency pulse heating method, heating by using a single power circuit in a powertrain is limited by hardware like a motor winding and a bus capacitor, and an adjustable range of a high frequency pulse alternating current generated by the powertrain is limited. Therefore, a heating rate of a power battery is limited. If two pulse alternating currents generated by a first power circuit and a second power circuit are used to heat the power battery at the same time, the heating rate may be increased. However, because there is a large phase difference between the pulse alternating currents flowing into the battery, the pulse alternating currents cancel each other, and therefore the heating rate is affected. When two pulse alternating currents appear alternately, directions and intensity of the two pulse alternating currents may affect each other. If the two pulse alternating currents have opposite directions or amplitudes, the two pulse alternating currents cancel each other to some extent, and consequently, effect of a superimposed current is weakened. In view of this, the embodiments provide a method for pulse heating a power battery of an electric vehicle and an electric vehicle, to improve heating efficiency of the power battery by reducing a phase difference between a pulse alternating current generated by a first power circuit and a pulse alternating current generated by a second power circuit.

Figure 2:
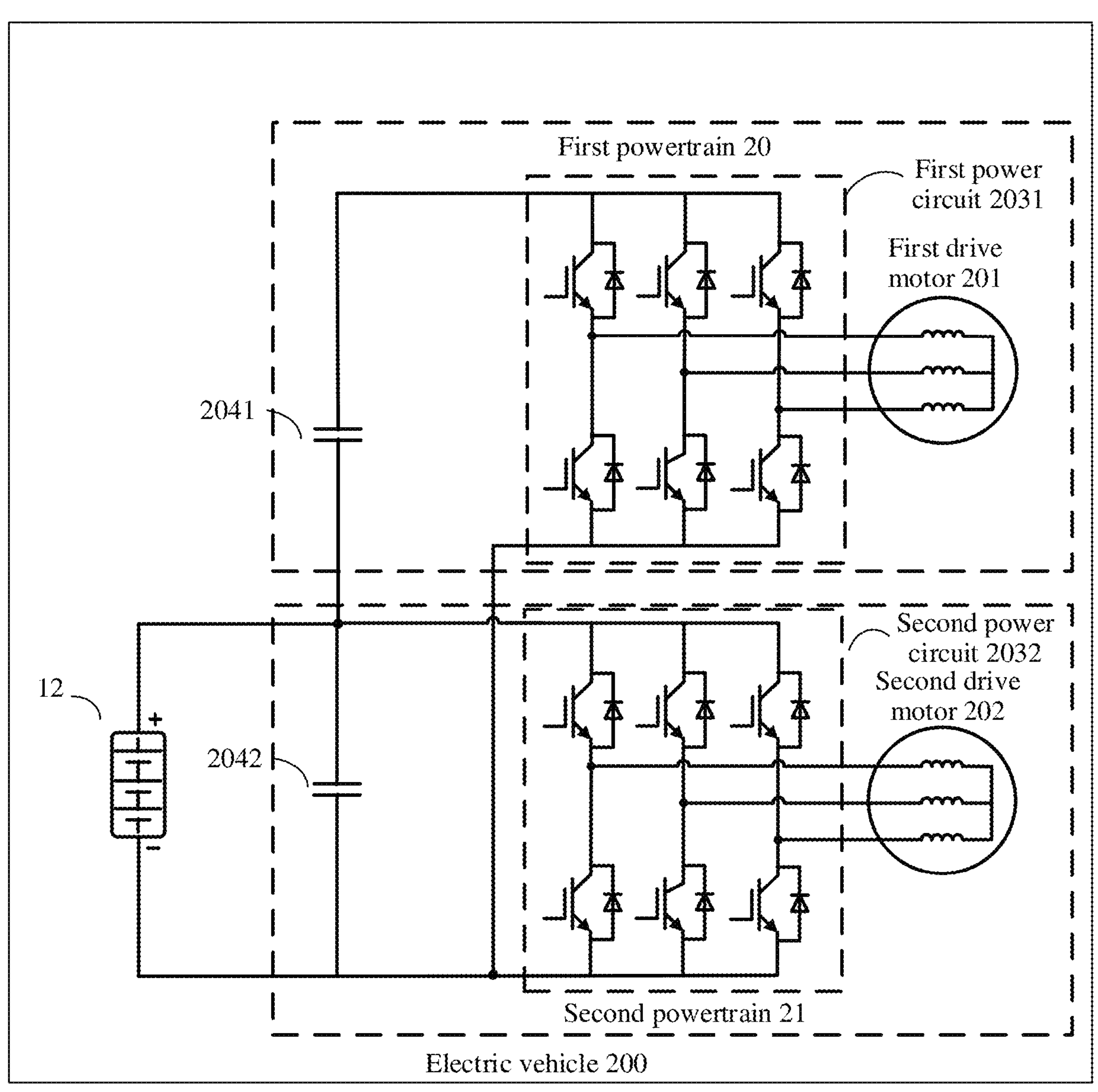
FIG. 2 is a diagram of a structure of an electric vehicle according to an embodiment.

FIG. 2 is a diagram of a structure of an electric vehicle according to an embodiment. An electric vehicle 200 shown in FIG. 2 includes a first powertrain 20 and a second powertrain 21. The first powertrain 20 is configured to be in transmission connection with two front wheels of the electric vehicle 200. The second powertrain 21 is configured to be in transmission connection with two rear wheels of the electric vehicle 200. The first powertrain 20 includes a first drive motor 201 and a first motor controller. The second powertrain 21 includes a second drive motor 202 and a second motor controller. The first motor controller includes a first power circuit 2031 and a first bus capacitor 2041. The second motor controller includes a second power circuit 2032 and a second bus capacitor 2042.

The first power circuit 2031 includes a first three-phase bridge arm, two ends of each bridge arm of the first three-phase bridge arm are respectively configured to connect two ends of the first bus capacitor 2041, the second power circuit 2032 includes a second three-phase bridge arm, two ends of each bridge arm of the second three-phase bridge arm are respectively configured to connect two ends of the second bus capacitor 2042, and the two ends of the first bus capacitor 2041 and the two ends of the second bus capacitor 2042 are separately configured to connect a positive electrode and a negative electrode of a power battery 12 through a direct current bus.

It should be noted that, in embodiments, that the first bus capacitor 2041 and the second bus capacitor 2042 may include one capacitor is used as an example (as shown in FIG. 2). In some possible implementations, the first bus capacitor 2041 and the second bus capacitor 2042 may further include at least two capacitors connected in series or in parallel. In other words, a quantity of capacitors of the first bus capacitor 2041 and the second bus capacitor 2042 and a connection manner between the capacitors are not limited in embodiments.

Figure 3A:
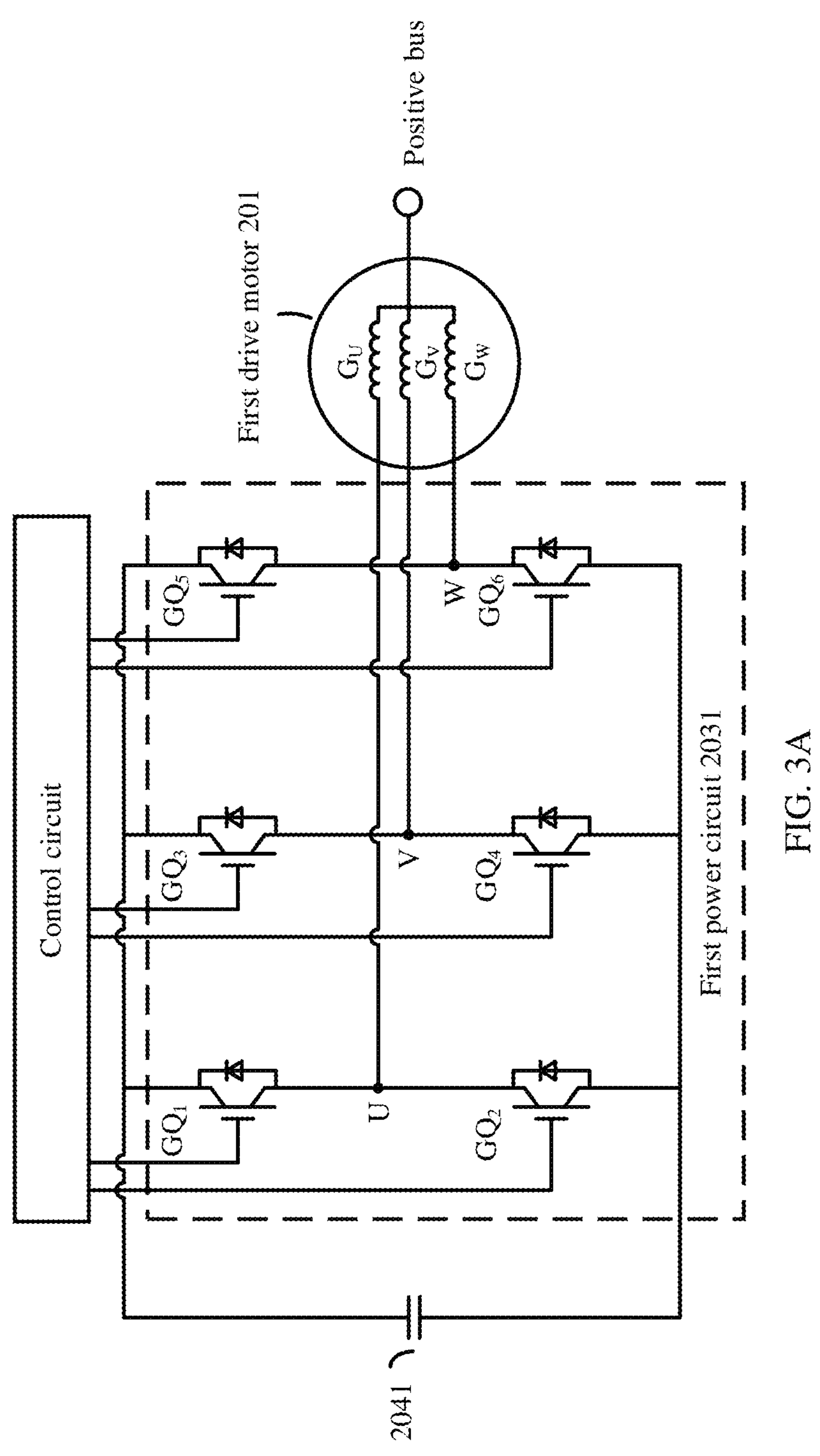
FIG. 3A is a schematic of a first power circuit.

FIG. 3A is a schematic of a first power circuit. A first power circuit 2031 includes three bridge arms. The first power circuit 2031 includes three parallel bridge arms, which may be denoted as: a U-phase bridge arm, a V-phase bridge arm, and a W-phase bridge arm. The first drive motor 201 includes three first drive motor 201 windings (for example, a first drive motor 201 winding $G_U$, a first drive motor 201 winding $G_V$, and a first drive motor 201 winding $G_W$) corresponding to the three bridge arms. In the U-phase bridge arm, an upper-bridge switching transistor is a switching transistor $GQ_1$, and a lower-bridge switching transistor is a switching transistor $GQ_2$. In the V-phase bridge arm, an upper-bridge switching transistor is a switching transistor $GQ_3$, and a lower-bridge switching transistor is a switching transistor $GQ_4$. In the W-phase bridge arm, an upper-bridge switching transistor is a switching transistor $GQ_5$, and a lower-bridge switching transistor is a switching transistor $GQ_6$. Collectors of the switching transistor $GQ_1$, the switching transistor $GQ_3$, and the switching transistor $GQ_5$ are connected to one end of the first bus capacitor 2041, and emitters of the switching transistor $GQ_2$, the switching transistor $GQ_4$, and the switching transistor $GQ_6$ are connected to another end of the first bus capacitor 2041. The emitter of the switching transistor $GQ_1$ and the collector of the switching transistor $GQ_2$ are connected to one end of the first drive motor 201 winding $G_U$. The emitter of the switching transistor $GQ_3$ and the collector of the switching transistor $GQ_4$ are connected to one end of the first drive motor 201 winding $G_V$. The emitter of the switching transistor $GQ_5$ and the collector of the switching transistor $GQ_6$ are connected to one end of the first drive motor 201 winding $G_W$. The other end of the winding $G_U$ of first drive motor 201, the other end of the first drive motor 201 winding $G_V$, and the other end of the first drive motor 201 winding $G_W$ may be referred to as center tap points of the first drive motor 201, and the center tap point of the first drive motor 201 is connected to a positive bus.

Figure 3B:
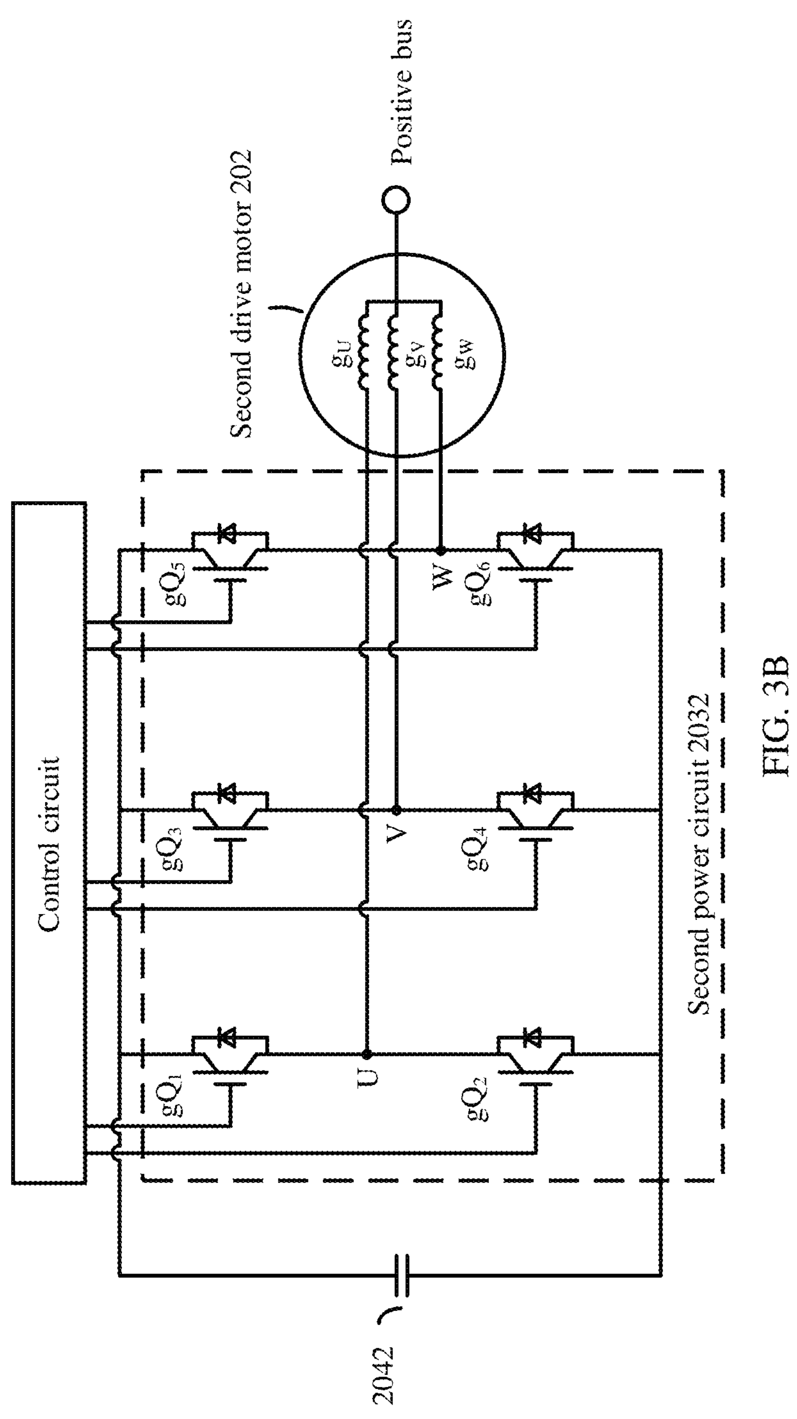
FIG. 3B is a schematic of a second power circuit.

FIG. 3B is a schematic of a second power circuit. The second power circuit 2032 includes three bridge arms. The second power circuit 2032 includes three parallel bridge arms, which may be denoted as: a U-phase bridge arm, a V-phase bridge arm, and a W-phase bridge arm. The second drive motor 202 includes three second drive motor 202 windings (for example, a second drive motor 202 winding $g_U$, a second drive motor 202 winding $g_V$, and a second drive motor 202 winding $g_W$) corresponding to the three bridge arms. In the U-phase bridge arm, an upper-bridge switching transistor is a switching transistor $gQ_1$, and a lower-bridge switching transistor is a switching transistor $gQ_2$. In the V-phase bridge arm, an upper-bridge switching transistor is a switching transistor $gQ_3$, and a lower-bridge switching transistor is a switching transistor $gQ_4$. In the W-phase bridge arm, an upper-bridge switching transistor is a switching transistor $gQ_5$, and a lower-bridge switching transistor is a switching transistor $gQ_6$. Collectors of the switching transistor $gQ_1$, the switching transistor $gQ_3$, and the switching transistor $gQ_5$ are connected to one end of the second bus capacitor 2042, and emitters of the switching transistor $gQ_2$, the switching transistor $gQ_4$, and the switching transistor $gQ_6$ are connected to another end of the second bus capacitor 2042. The emitter of the switching transistor $gQ_1$ and the collector of the switching transistor $gQ_2$ are connected to one end of the second drive motor 202 winding $g_U$. The emitter of the switching transistor $gQ_3$ and the collector of the switching transistor $gQ_4$ are connected to one end of the second drive motor 202 winding $g_V$. The emitter of the switching transistor $gQ_5$ and the collector of the switching transistor $gQ_6$ are connected to one end of the second drive motor 202 winding $g_W$. The other end of the second drive motor 202 winding $g_U$, the other end of the second drive motor 202 winding $g_V$, and the other end of the second drive motor 202 winding $g_W$ may be referred to as center tap points of the second drive motor 202, and the center tap point of the second drive motor 202 is connected to the positive bus.

The switching transistor in the bridge arm may be an insulated gate bipolar transistor (IGBT) and an anti-parallel diode thereof, a metal oxide semiconductor field effect transistor (MOSFET), or the like. A specific structure inside the switching transistor is not limited.

It should be noted that, in FIG. 2, an example in which the first drive motor 201 is a three-phase alternating current motor and the second drive motor 202 is a three-phase alternating current motor is used. In some possible implementations, the first drive motor 201 may be a two-phase alternating current motor, a four-phase alternating current motor, a multi-phase alternating current motor, or the like. In this case, the first power circuit 2031 may adaptively change a quantity of bridge arms based on a quantity of first drive motor windings in different types of first drive motors 201. For example, when the first drive motor 201 is the two-phase alternating current motor, the first power circuit 2031 includes a two-phase bridge arm. When the first drive motor 201 is the four-phase alternating current motor, the first power circuit 2031 includes a four-phase bridge arm.

Similarly, the second drive motor 202 may alternatively be a two-phase alternating current motor, a four-phase alternating current motor, a five-phase alternating current motor, or the like. In this case, the second power circuit 2032 adaptively changes a quantity of bridge arms based on a quantity of first drive motor 201 windings in different types of first drive motors 201. For example, when the second drive motor 202 is the two-phase alternating current motor, the second power circuit 2032 includes a two-phase bridge arm. When the second drive motor 202 is a four-phase alternating current motor, the second power circuit 2032 includes a four-phase bridge arm.

The method includes controlling at least one bridge arm of the first power circuit 2031, so that at least one bridge arm power battery 12 of the second power circuit 2032 is charged and discharged at a preset period.

It should be noted that only at least one bridge arm of the first power circuit 2031 may be controlled to enable the power battery 12 and the bus capacitor 204 to perform charging and discharging at a preset period, or at least one bridge arm of the second power circuit 2032 may be separately controlled to enable the power battery 12 to perform charging and discharging at the preset period, or at least one bridge arm of the first power circuit 2031 and at least one bridge arm of the second power circuit 2032 may be simultaneously controlled to enable the power battery 12 and the bus capacitor 204 to perform charging and discharging at the preset period.

Optionally, a synchronization packet is sent to the first motor controller and the second motor controller, and after receiving the packet, the first motor controller and the second motor controller record a moment at which the synchronization packet is received and return the moment to a vehicle controller. In this way, instant deviations between the first motor controller and the vehicle controller and between the second motor controller and the vehicle controller may be respectively calculated. When the vehicle controller delivers a control instruction, delay processing is performed on the first motor controller and the second motor controller. In this way, a phase deviation caused by a delay of a hardware communication channel may also be compensated, so that a phase difference output by two power circuits is reduced, thereby improving heating efficiency of the power battery 12.

The control circuit may be a central processing unit (CPU), another general purpose processor, a digital signal processor (DSP), an application-specific integrated circuit (ASIC), a field programmable gate array (FPGA) or another programmable logic device, a discrete gate or transistor logic device, a discrete hardware component, or the like.

In a possible implementation, the method includes:

in response to that a temperature of the power battery is less than a first preset temperature, controlling one of the first power circuit and the second power circuit to output a three-phase current; and in response to that the temperature of the power battery is less than a second preset temperature, controlling both the first power circuit and the second power circuit to output the three-phase current, where the second preset temperature is less than the first preset temperature.

The three-phase current is used to generate a pulse alternating current on the direct current bus, and the pulse alternating current is used to heat the power battery.

The method provided in the embodiments may be used for pulse heating the power battery. In a process of pulse heating the power battery, according to the method provided in the embodiments, one power circuit may be selected based on a temperature of the power battery to generate a pulse alternating current, or two power circuits may simultaneously generate pulse alternating currents. If the temperature of the battery is high, the one power circuit may be used to generate the pulse alternating current to heat the power battery. If the temperature of the battery is low, the two power circuits may be used to generate the pulse alternating currents to heat the power battery with higher heating power.

In a possible implementation, the method includes: in response to that the temperature of the power battery 12 is less than a specified first temperature threshold or in response to a heating instruction, controlling at least one bridge arm of the first power circuit 2031 or at least one bridge arm of the second power circuit 2032, so that the power battery 12 and the bus capacitor perform charging and discharging at the preset period. The preset period can be determined by alternating current internal resistance of the power battery 12, and is set based on the alternating current internal resistance of the power battery 12 and expected heating power.

The first temperature threshold may be a temperature at which the power battery 12 works normally. When the temperature of the power battery 12 is low (lower than the first temperature threshold), a charging/discharging speed of the power battery 12 is low. The at least one bridge arm of the second power circuit 2032 or the at least one bridge arm of the first power circuit 2031 is controlled, so that the power battery 12 and the bus capacitor perform charging and discharging at the preset period, and the power battery 12 heats the battery by using heat generated by the alternating current resistance of the power battery 12. Therefore, a charging and discharging capability of the power battery 12 in a low temperature environment is improved.

When the heating instruction is received, the at least one bridge arm of the first power circuit 2031 or the at least one bridge arm of the second power circuit 2032 is controlled, so that the power battery 12 and the bus capacitor perform charging and discharging at the preset period. The heating instruction may be delivered by using a vehicle controller or another control component in the vehicle, and required heating power is calculated based on a current temperature of the power battery 12. The heating instruction carries the heating power, and the control circuit controls, based on the heating power, the at least one bridge arm of the first power circuit 2031 or the at least one bridge arm of the second power circuit 2032, so that the power battery 12 heats the battery by using heat generated by the alternating current resistance of the power battery 12, thereby improving the charging and discharging capability of the power battery 12 in the low temperature environment.

In the foregoing process, when the pulse alternating current generated on the direct current bus is less than the preset current, a duty cycle of a pulse width modulation (PWM) control signal output to the at least one bridge arm of the first power circuit 2031 and the at least one bridge arm of the second power circuit 2032 may be increased, to increase a current value of a charging/discharging current of the power battery 12. When the current value of the charge/discharge current of the power battery 12 is less than a preset current, the duty cycle of the PWM control signal output to the at least one bridge arm of the first power circuit 2031 and the at least one bridge arm of the second power circuit 2032 may be reduced, to reduce the current value of the charge/discharge current of the power battery 12. For example, if a charge/discharge current of the power battery 12 is Is, and a preset current is Is', a current difference (Is−Is') is input to a PID controller, and the PID controller calculates, by using the current difference (Is−Is'), a duty cycle of an output PWM control signal, to implement PID automatic control, and enable the power battery 12 to obtain stable heating power.

In a possible implementation, the method includes: in response to an acceleration signal generated by a throttle pedal of an electric vehicle, controlling, at least one bridge arm of the first power circuit, so that the power battery 12 and the bus capacitor perform charging and discharging at the preset period.

In a possible implementation, the control circuit includes a first drive motor control circuit and a second drive motor control circuit. The first drive motor control circuit includes a first drive motor direct axis current feedback control circuit and a first drive motor quadrature axis current feedback control circuit. The first drive motor direct axis feedback control circuit is configured to receive a first drive motor direct axis current given signal and a direct axis current feedback signal of a three-phase current of the first drive motor, and output a first drive motor direct axis current feedback control signal. The first drive motor direct axis feedback control circuit is configured to receive a first drive motor quadrature axis current given signal and a quadrature axis current feedback signal of the three-phase current of the first drive motor, and output a first drive motor quadrature axis current feedback control signal. The first drive motor direct axis current feedback control signal and the first drive motor quadrature axis current feedback control signal are used to adjust a phase, a frequency, and an amplitude of the three-phase current of the first drive motor. The second drive motor control circuit includes a second drive motor direct axis current feedback control circuit and a second drive motor quadrature axis current feedback control circuit. The second drive motor direct axis feedback control circuit is configured to receive a second drive motor direct axis current given signal and a direct axis current feedback signal of a three-phase current of the second drive motor, and output a second drive motor direct axis current feedback control signal. The second drive motor direct axis feedback control circuit is configured to receive a second drive motor quadrature axis current given signal and a quadrature axis current feedback signal of the three-phase current of the second drive motor, and output a second drive motor quadrature axis current feedback control signal. The second drive motor direct axis current feedback control signal and the second drive motor quadrature axis current feedback control signal are used to adjust a phase, a frequency, and an amplitude of the three-phase current of the second drive motor.

Figure 4:
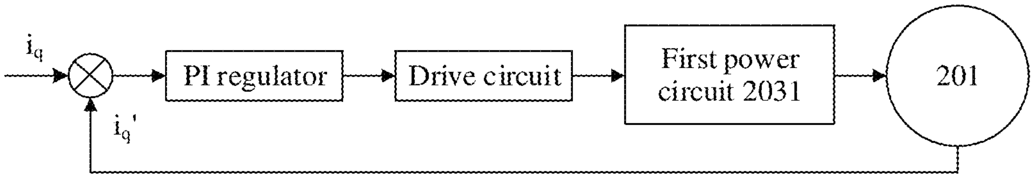
FIG. 4 is a schematic of a structure of a first drive motor quadrature axis current feedback control circuit.

The first drive motor control circuit includes the first drive motor direct axis current feedback control circuit and the first drive motor quadrature axis current feedback control circuit. The second drive motor control circuit includes the second drive motor direct axis current feedback control circuit and the second drive motor quadrature axis current feedback control circuit. The following embodiment uses the first drive motor control circuit as an example. The first drive motor control circuit is configured to perform closed-loop control on a direct axis current and a quadrature axis current of the drive motor during pulse heating. FIG. 4 is a schematic of a first drive motor quadrature axis current feedback control circuit. The first drive motor control circuit includes a first drive motor direct axis current feedback control circuit and a first drive motor quadrature axis current feedback control circuit.

The first drive motor quadrature axis current feedback control circuit generates a quadrature axis voltage based on a quadrature axis current indicated by a quadrature axis current given signal, and inputs the quadrature axis voltage to the first drive motor 201. At the same time, the first drive motor quadrature axis current feedback control circuit adjusts a magnitude of a quadrature axis current given signal based on a quadrature axis current of the first drive motor 201 indicated by a quadrature axis current feedback signal collected from the first drive motor 201, to implement closed-loop control of the quadrature axis current.

In a possible implementation, the control circuit includes a first drive motor inverse Park transformation circuit, a second drive motor inverse Park transformation circuit, a first drive motor drive circuit, and a second drive motor drive circuit. The first drive motor drive circuit is configured to output three groups of first drive motor drive signals, and each group of first drive motor drive signals is used to control switching frequencies and duty cycles of an upper-bridge arm switching transistor and a lower-bridge arm switching transistor of a switching transistor bridge arm of the first power circuit. The second drive motor drive circuit is configured to output three groups of second drive motor drive signals, and each group of second drive motor drive signals is used to control switching frequencies and duty cycles of an upper-bridge arm switching transistor and a lower-bridge arm switching transistor of a switching transistor bridge arm of the second power circuit. The first drive motor inverse Park transformation circuit is configured to receive a first drive motor voltage given signal, a first drive motor feedback control signal, and a first drive motor rotor position signal, and control phase differences of the three groups of first drive motor drive signals and a frequency and a duty cycle of each group of first drive motor drive signals. The second drive motor inverse Park transformation circuit is configured to receive a second drive motor voltage given signal, a second drive motor feedback control signal, and a second drive motor rotor position signal, and control phase differences of the three groups of second drive motor drive signals and a frequency and a duty cycle of each group of second drive motor drive signals.

Still as shown in FIG. 4, $i_q$ is a quadrature axis current value indicated by a quadrature axis current given signal, and $i_q'$ is a first drive motor quadrature axis current indicated by a quadrature axis current feedback signal. The first drive motor quadrature axis current feedback control circuit compares a difference between $i_q$ and $i_q'$. A PI regulator outputs, based on the difference between $i_q$ and $i_q'$, an adjustment value and adjusts a quadrature axis current given signal sent to drive electric power in a timely manner. The drive circuit outputs, based on the adjusted quadrature axis current given signal, a PWM control signal to control the first power circuit to output a three-phase current. A quadrature axis current component of the three-phase current is a quadrature axis current indicated by the quadrature axis current given signal.

In a possible implementation, the control circuit includes a first drive motor voltage signal generator and a second drive motor voltage signal generator. The first drive motor voltage signal generator is configured to output a first drive motor voltage given signal based on a first drive motor voltage frequency signal and a first drive motor voltage amplitude signal. The second drive motor voltage signal generator is configured to output a second drive motor voltage given signal based on a second drive motor voltage frequency signal and a second drive motor voltage amplitude signal.

In a possible implementation, a quadrature axis component of the three-phase current of the first drive motor and a quadrature axis component of the three-phase current of the second drive motor are zero, or torque values of a three-phase motor of the first drive motor and a three-phase motor of the second drive motor are less than a preset torque value.

In this embodiment, the quadrature axis current indicated by the quadrature axis current given signal is 0. As described above, the quadrature axis current of the first drive motor 201 is used to control torque output by the drive motor. In a high frequency pulse heating process of the power battery 12, if the quadrature axis current of the first drive motor 201 is not zero, the first drive motor 201 outputs unexpected torque. The unexpected torque of the first drive motor 201 is conducted to a wheel, so that the electric vehicle 10 generates vibration and noise, affecting ride experience of the electric vehicle 10. However, if open-loop control is performed on the quadrature axis current of the first drive motor 201, it is difficult to accurately control the quadrature axis current of the first drive motor 201 to be zero, so that the first drive motor 201 easily generates unexpected torque. Therefore, the motor controller provided in embodiments performs closed-loop control on the quadrature axis current of the first drive motor 201, so that the quadrature axis current can be precisely controlled to be zero, thereby avoiding unexpected torque output of the first drive motor 201, and improving NVH performance and driving comfort of the electric vehicle 10.

In a possible implementation, the first drive motor direct axis current given signal is a direct current bias signal, the first drive motor quadrature axis current given signal is 0, the second drive motor direct axis current given signal is a direct current bias signal, and the second drive motor quadrature axis current given signal is 0. The direct current bias is a positive direct current bias or a negative direct current bias.

In this embodiment, the motor controller receives a heating instruction, and determines a direct axis current given signal and a direct axis current given signal based on heating power of the power battery 12 indicated by the heating instruction, where the direct axis current given signal is used to indicate a frequency and an amplitude of a square wave voltage, and the direct axis current given signal is used to enable the square wave voltage to generate direct current bias. In other words, a direct axis voltage input by the motor controller to the drive motor is a direct axis voltage with direct current bias, and the direct axis voltage with the direct current bias can increase an effective value of the three-phase current of the drive motor, to improve heating efficiency of the power battery 12.

Figure 5:
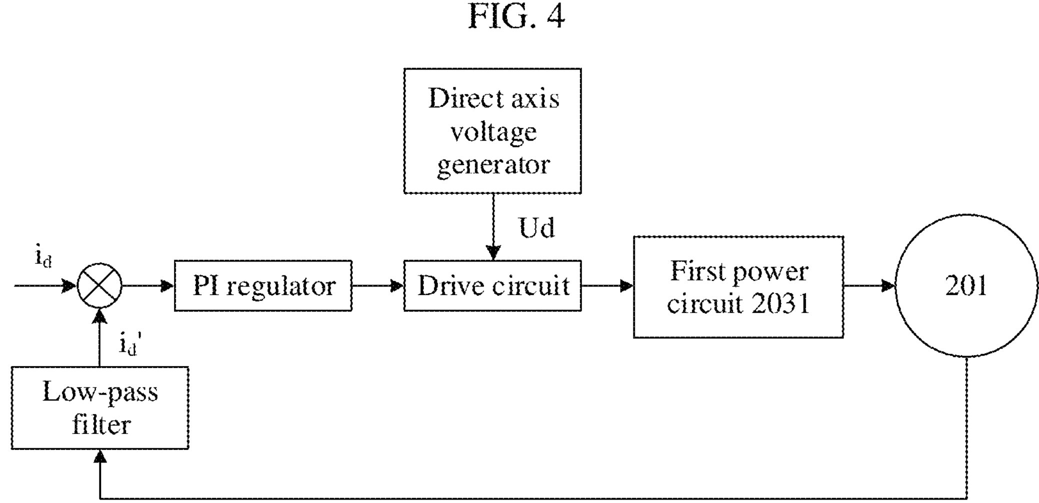
FIG. 5 is a schematic of a structure of a first drive motor direct axis current feedback control circuit.

FIG. 5 is a schematic of a first drive motor direct axis current feedback control circuit. As shown in FIG. 5, $i_d$ is a direct axis current given signal, $i_d'$ is a direct axis current feedback signal, and $U_d$ is a direct axis current given signal. As described above, in a high frequency pulse heating process of the power battery 12, a quadrature axis current of the first drive motor 201 is zero, to ensure that the drive motor does not output unexpected torque. Therefore, in the high frequency pulse heating process of the power battery 12, the motor controller inputs a direct axis current to the first drive motor 201, to generate a high frequency pulse alternating current on a bus capacitor. Optionally, the control circuit further includes a low-pass filter. The low-pass filter is configured to filter a high frequency component in a direct axis current feedback signal of a three-phase current of the first drive motor and a high frequency component in a direct axis current feedback signal of a three-phase current of the second drive motor.

In an implementation, a direct axis current injected by the first motor controller to the first drive motor is a sine wave current. However, when a direct axis voltage of the first drive motor 201 is a sine wave voltage, a ripple current of a high frequency pulse alternating current finally generated on the bus capacitor is large, so that heating efficiency of the power battery 12 is low. In embodiments, the direct axis voltage input by the motor controller to the drive motor is a square wave voltage Ud, and the direct axis voltage of the first drive motor 201 is a square wave voltage, so that ripples of a bus current of the bus capacitor can be effectively reduced, thereby improving the heating efficiency of the power battery 12.

To implement closed-loop control of the direct axis current, the motor controller provided in embodiments includes the low-pass filter. The low-pass filter is configured to filter a high frequency component of the direct axis current collected from the first drive motor 201, to obtain direct current bias in the direct axis current of the first drive motor 201. The direct axis current feedback signal is obtained after the high frequency component of the direct axis current collected from the first drive motor 201 is filtered by the low-pass filter. A direct axis current control loop compares the direct axis current feedback signal with the direct axis current given signal and then adjusts a direct axis current bias value. The square wave voltage signal is generated after the direct axis current given signal is superimposed with the square wave voltage signal.

In this embodiment, the control circuit includes a first drive motor voltage signal generator, and the first drive motor voltage signal generator is configured to output the direct axis current given signal based on a square wave voltage frequency signal and a square wave voltage amplitude signal.

Figure 6:
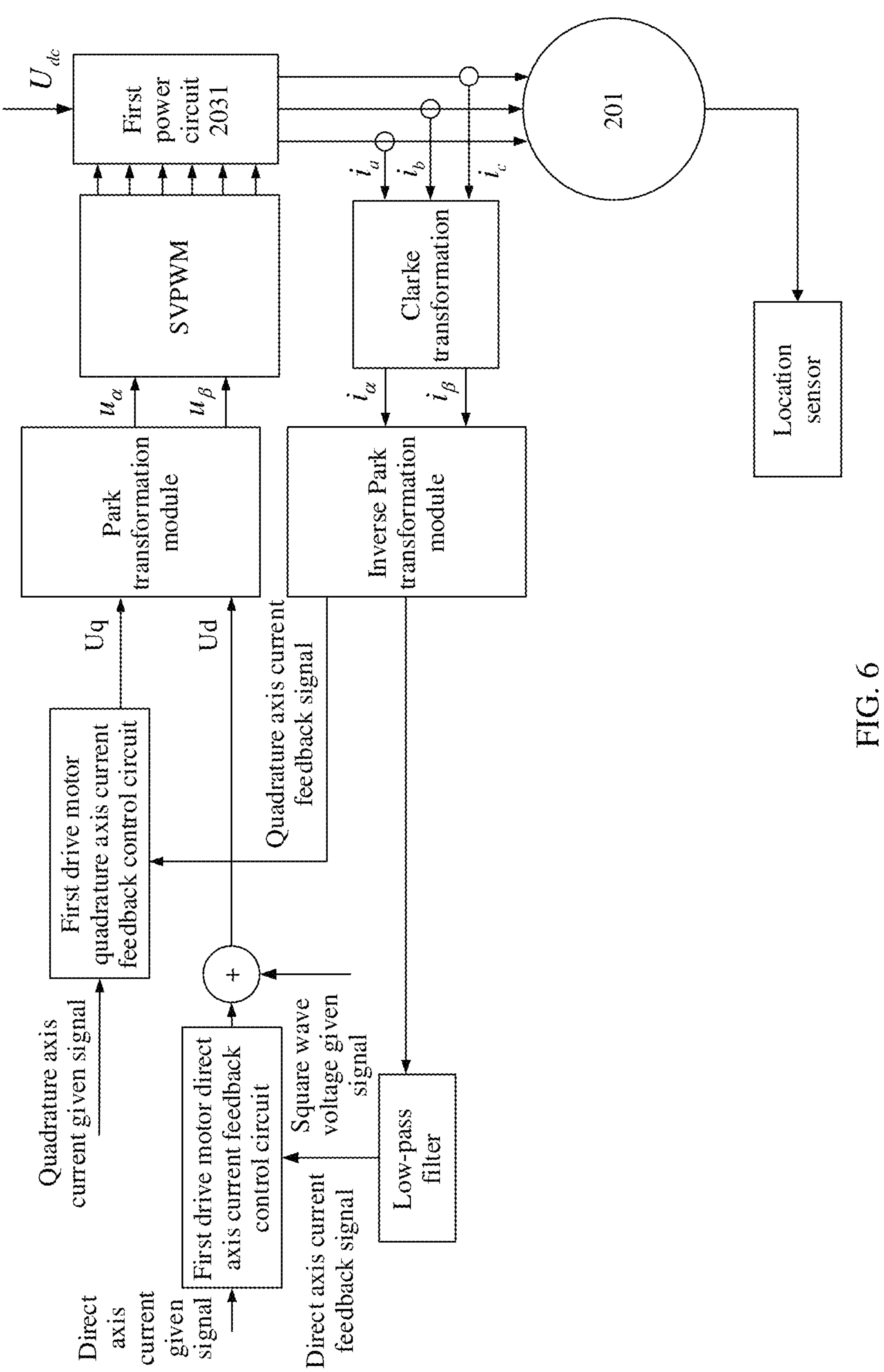
FIG. 6 is a schematic of a structure of a feedback control circuit.

As shown in FIG. 6, the first drive motor direct axis current feedback control circuit further includes a Park transformation module and a Clarke transformation module. The Park transformation module is configured to transform two components in an αβ coordinate system into an orthogonal rotating coordinate system (dq). The Clarke transformation module converts a time domain component of a three-phase system (in an abc coordinate system) into two components in an orthogonal static coordinate system (αβ). For example, in embodiments, the Park transformation module receives a quadrature axis voltage signal Uq and a direct axis voltage signal Ud, and performs inverse Park transformation on signals Uq and Ud in a direct axis-quadrature axis coordinate system to obtain voltage signals Uα and Uβ in the αβ coordinate system. The drive circuit generates a PWM control signal based on signals Uα and Uβ. The PWM control signal is used to control a turn-on frequency and a duty cycle of the switching transistor of the three-phase bridge arm. In another aspect, a current sensor collects three-phase current signals $i_a$, $i_b$, and $i_c$ of the first drive motor 201, and the Clarke transformation module is configured to convert the current signals $i_a$, $i_b$, and $i_c$ in the three-phase coordinate system into current signals $i_\alpha$ and $i_\beta$ in the αβ coordinate system. Then, the Park transformation module performs Park transformation on the current signals $i_\alpha$ and $i_\beta$ in the αβ coordinate system, to convert the current signals $i_\alpha$ and $i_\beta$ in the αβ coordinate system into current signals $i_d$, $i_q$, and $i_q$ in the direct axis-quadrature axis coordinate system, and outputs the current signals as quadrature axis current feedback signals. After a high frequency signal component is filtered by the low-pass filter, $i_d$ is output as a direct axis current feedback signal.

In embodiments, a waveform of a charge/discharge current of the bus capacitor is a sine wave, and a frequency of the bus current is equal to a frequency of a square wave voltage signal. Frequencies of a direct axis current, a phase current of a drive motor, and a bus current that are output by a dual-motor controller provided in embodiments are the same. However, it should be noted that a frequency of a square wave voltage signal output by the dual-motor controller provided in embodiments is decoupled from a switching frequency of a switching transistor of the dual-motor controller in a pulse heating process. In other words, there is no direct relationship between switching frequencies of switching transistors of two power circuits and a frequency of a square wave voltage signal in the pulse heating process. For example, the switching frequency of the switching transistor may be 8 kHz, and the frequency of the square wave voltage signal may be 2000 Hz.

When windings of the first drive motor 201 and the second drive motor 202 are affected by a control signal converted from a high frequency voltage signal, because a period of the control signal is very short, a current flowing through the windings of the first drive motor 201 and the second drive motor 202 changes rapidly in very short time. The rapidly changing current generates a changing electromagnetic field on the winding, the magnetic field causes high frequency vibration of the winding, and the high frequency vibration causes each part of the winding to vibrate with a small amplitude. These small amplitude vibrations are converted into sound waves through resonance of materials, friction, and air conduction. In this case, the first drive motor 201 and the second drive motor 202 are similar to acoustic devices, and therefore generate noise. In addition, because the frequency of the high frequency voltage signal is fixed, finally generated noise also has a fixed frequency. If the frequency is within a frequency range that can be heard by a human ear, the noise is perceived as a sharp and harsh sound. This brings poor user experience.

Therefore, in embodiments, frequencies of currents of each phase of a three-phase current output by the first power circuit 2031 and the second power circuit 2032 is controlled, to optimize high frequency noise in a heating process of the power battery 12, thereby improving user experience.

Because the frequencies of currents of each phase in any two adjacent periods are different, it is equivalent that frequencies of currents of each phase flowing through the first drive motor winding and the second drive motor winding are also different, and vibration frequencies generated by each winding under the action of a rapidly changing current are also different. Therefore, if frequencies in any two adjacent periods are different, noise generated by the first drive motor winding and the second drive motor winding in the two adjacent periods also has at least two different frequencies. In addition, because time of each period is short, noise energy generated by vibration may be dispersed to a wide frequency range, to reduce noise perception on a specific frequency, thereby providing better user experience.

The bus current is formed through superposition of currents of three phases. Therefore, an amplitude of a current of each phase determines an amplitude of the bus current. If the current of each phase of the three-phase current may maintain a same amplitude in any two adjacent periods, magnitudes of bus currents formed based on superposition of the three-phase current may also maintain a same amplitude in any two adjacent periods. If the bus current may maintain a same amplitude in any two adjacent periods, heating power of the power battery 12 is stable under an action of the bus current, so that the heating process of the power battery 12 can be optimized.

In a possible implementation, the three-phase current output by the first power circuit is a first three-phase current, the three-phase current output by the second power circuit is a second three-phase current, frequencies of currents of each phase of the first three-phase current are different in any two adjacent periods, and frequencies of currents of each phase of the second three-phase current are different in any two adjacent periods.

Because frequencies of the first three-phase current and the second three-phase current are different in any two adjacent periods, it is equivalent that frequencies of currents of each phase flowing through the first drive motor 201 winding and the second drive motor 202 winding are also different, and vibration frequencies generated by each winding under the action of a rapidly changing current are also different. Therefore, if the frequencies of the first three-phase current and the second three-phase current are different in any two adjacent periods, noise generated by the first drive motor 201 winding and the second drive motor 202 winding in the two adjacent periods also has at least two different frequencies. In addition, because time of each period is short, noise energy generated by vibration may be dispersed to a wide frequency range, to reduce noise perception on a specific frequency, thereby providing better user experience.

The control circuit in each motor controller is configured to: drive operating of an upper-bridge arm switching transistor and a lower-bridge arm switching transistor of each switching transistor bridge arm, and control bridge arm midpoints of three switching transistor bridge arms to separately output three-phase currents. Frequencies of currents of each phase of the three-phase are different in any two adjacent periods.

Because the frequencies of currents of each phase in any two adjacent periods are different, it is equivalent that frequencies of the phase current signals flowing through the winding are also different, and vibration frequencies generated by each winding under the action of a rapidly changing current are also different. Therefore, in the embodiments, noise energy generated by vibration may be dispersed to a wide frequency range, to reduce noise perception on a specific frequency, thereby providing better user experience.

In a possible implementation, in response to that noise of the first drive motor is greater than a specified threshold, the control circuit enables the first power circuit to output the first three-phase current at different frequencies in any two adjacent periods; or in response to that noise of the second drive motor is greater than a specified threshold, the control circuit enables the second power circuit to output the second three-phase current at different frequencies in any two adjacent periods.

In a possible implementation, frequencies of the current of each phase of the first three-phase current in a first half period and a second half period in a same period are different, and frequencies of the current of each phase of the second three-phase current in a first half period and a second half period in a same period are different.

To further reduce noise, frequencies of a first half period and a second half period of currents of each phase of the first three-phase current and currents of each phase of the second three-phase current in a same period may also be different. If frequencies of the currents of each phase of the first three-phase current and the currents of each phase of the second three-phase current are different in a positive half period and a negative half period in a same period, vibration frequencies of the first drive motor winding and the second drive motor winding in the same period are also different. In this manner in the embodiments, noise energy generated by vibration may be more evenly dispersed to a wider frequency range, thereby further reducing noise perception on a specific frequency.

A direct axis current component is used to control directions and magnitudes of magnetic fields generated by the first drive motor and the second drive motor. By controlling the directions and magnitudes of the magnetic fields generated by the first drive motor and the second drive motor, magnitudes and directions of a phase current and a bus current can be adjusted, thereby adjusting heating power of the power battery 12 and eliminating noise in a heating process. For example, the direct axis current component may be determined based on heating power of the power battery 12 indicated by a heating instruction. The direct axis current component includes two parts of parameters: one part is a frequency and an amplitude of a direct axis voltage, and the other part is a bias of the direct axis voltage. Optionally, the direct axis current component may include a voltage given signal and a direct axis bias signal. The voltage given signal is used to indicate a frequency and an amplitude of a voltage, and the direct axis bias signal is used to enable the voltage to generate direct current bias. For example, the dual-motor controller inputs the direct axis voltage signal with the direct current bias to the first drive motor drive circuit and the second drive motor drive circuit, so that the first drive motor drive circuit and the second drive motor drive circuit generate a control signal based on the direct axis voltage signal, and drive the first drive motor and the second drive motor by using the control signal. The direct axis voltage signal with the direct current bias can improve effective values of three-phase currents of the first drive motor and the second drive motor, thereby improving heating efficiency of the power battery. It should be noted that the direct current bias of the direct axis voltage signal may be a positive direct current bias, or may be a negative direct current bias, and a person skilled in the art may separately set the direct current bias based on a requirement for heating power.

To make the current of each phase have different frequencies in any two adjacent periods, a voltage given signal in a direct axis current component of the three-phase current needs to be set to different frequencies in any two adjacent periods. The direct axis current component of the three-phase current is related to a voltage given signal input by a drive circuit. Therefore, if the voltage given signal includes at least two different frequencies in any two adjacent periods, frequencies of the direct axis current component of the three-phase current may be different in any two adjacent periods.

The first drive motor voltage given signal and the second drive motor voltage given signal may include a plurality of signals with different frequencies. In a possible implementation, the voltage given signal includes a first direct axis current signal and a second direct axis current signal, and the first direct axis current signal and the second direct axis current signal have different frequencies. In addition, a type of the voltage given signal includes at least one of the following: a sine wave, a triangular wave, and a square wave. A person skilled in the art may determine a type of a voltage given signal based on a value of a ripple current of a pulse alternating current and heating efficiency. This is not limited herein.

Optionally, a signal type of the voltage given signal in a first period of the two adjacent periods may be the first direct axis current signal, and a signal type of the voltage given signal in a second period of the two adjacent periods may be the second direct axis current signal. Alternatively, a signal type of the voltage given signal in a first period of the two adjacent periods may be the second direct axis current signal, and a signal type of the voltage given signal in a second period of the two adjacent periods may be the first direct axis current signal. In this way, the voltage given signal includes two different frequencies in any two adjacent periods, so that frequencies of currents of each phase of the three-phase current are different in any two adjacent periods.

In a possible implementation, in response to that the noise of the first drive motor is greater than the specified threshold, the control circuit enables the first drive motor voltage given signal have different frequencies in any two adjacent periods; or in response to that the noise of the second drive motor is greater than the specified threshold, enables the second drive motor voltage given signal have different frequencies in any two adjacent periods. In this manner in the embodiments, noise energy generated by vibration of windings corresponding to the first drive motor 201 and the second drive motor 202 may be more evenly dispersed to a wide frequency range, thereby further reducing noise perception on a specific frequency.

In a possible implementation, types of the first drive motor voltage given signal and the second drive motor voltage given signal in the foregoing embodiment include at least one of the following: a sine wave, a triangular wave, and a square wave. A person skilled in the art may determine a type of a voltage given signal based on a value of a ripple current of a pulse alternating current and heating efficiency. This is not limited herein.

In a possible implementation, the first drive motor voltage given signal in the foregoing embodiment includes a first signal and a second signal. Frequencies of the first signal and the second signal are different, and volt-second products of the first signal and the second signal are the same. The second drive motor voltage given signal in the foregoing embodiment includes a third signal and a fourth signal. Frequencies of the third signal and the fourth signal are different, and volt-second products of the third signal and the fourth signal are the same. A volt-second product of a signal refers to an integral of the signal, and represents accumulation of the signal on a time axis. The volt-second product may also be referred to as a voltage-time integral, and is also used to describe an accumulated value of energy or amplitude of a signal in a period of time. The volt-second product of the signal may be expressed in the following integral form: volt-second product=∫ (signal amplitude)×(time) dt, where the integral is performed from start time to end time. The volt-second product can be used to measure energy consumption or accumulation of a signal over a period of time. For a periodic signal, calculation of a volt-second product can be used to analyze average energy of the signal. In this way, it may be understood that, in adjacent periods, frequencies of the first drive motor voltage given signal are different, and amplitudes of the first drive motor voltage given signal are also different. In addition, in adjacent periods, frequencies of the second drive motor voltage given signal are different, and amplitudes of the second drive motor voltage given signal are also different. In this case, on the premise that frequencies of the first drive motor voltage given signal and the second drive motor voltage given signal in any two adjacent periods are different, volt-second products may be the same, to optimize a heating process of the power battery 12 and ensure stability of heating power of the power battery 12.

In a possible implementation, a signal of the first drive motor voltage given signal in any period includes at least one of the following: a first signal, a second signal, a signal formed by a positive half period of the first signal and a negative half period of the second signal, and a signal formed by a positive half period of the second signal and a negative half period of the first signal. A signal of the second drive motor voltage given signal in any period includes at least one of the following: a third signal, a fourth signal, a signal formed by a positive half period of the third signal and a negative half period of the fourth signal, and a signal formed by a positive half period of the fourth signal and a negative half period of the third signal.

Figure 7:
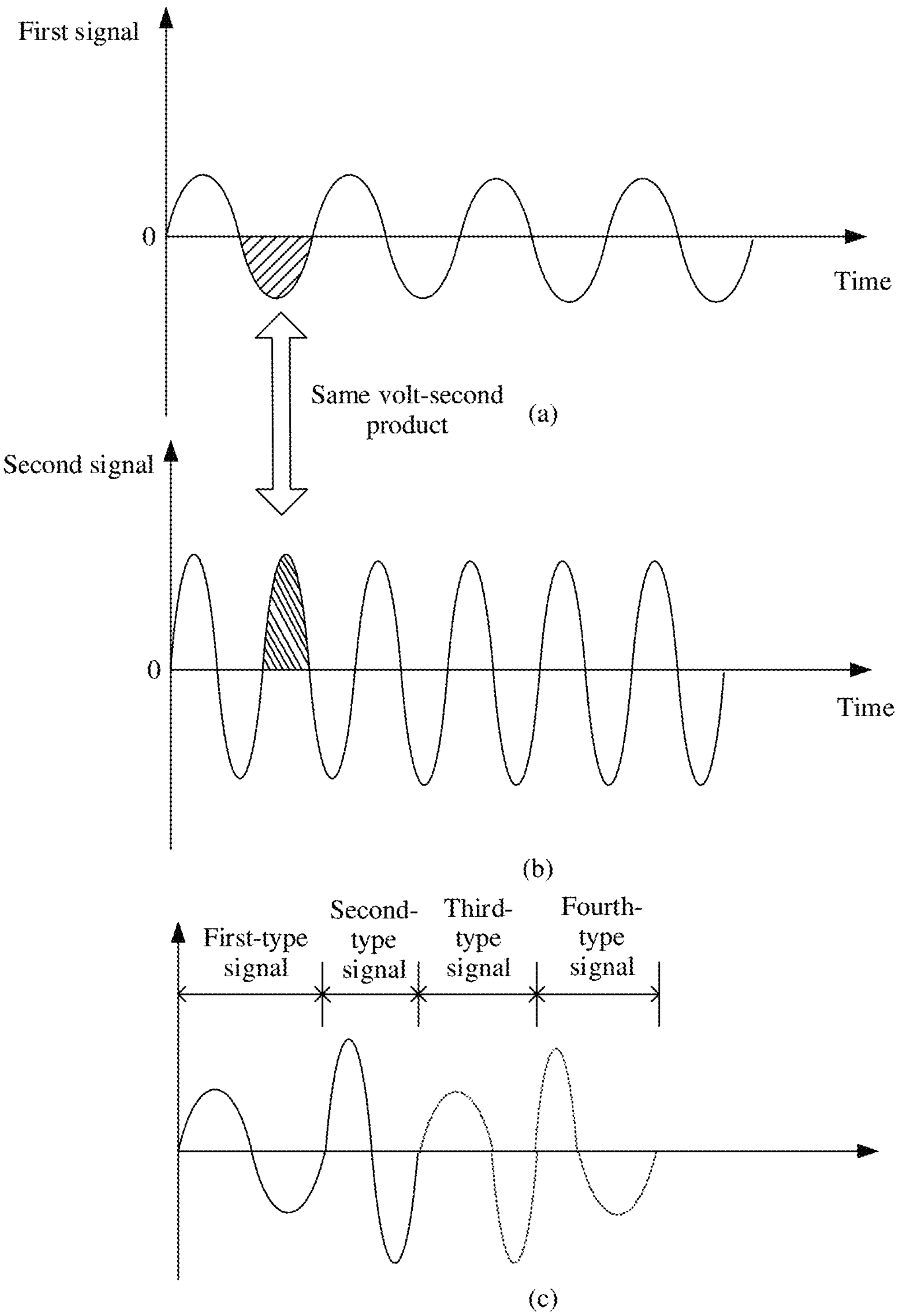
FIG. 7 is a waveform diagram of a direct axis signal and various types of signals.
Figure 8A:
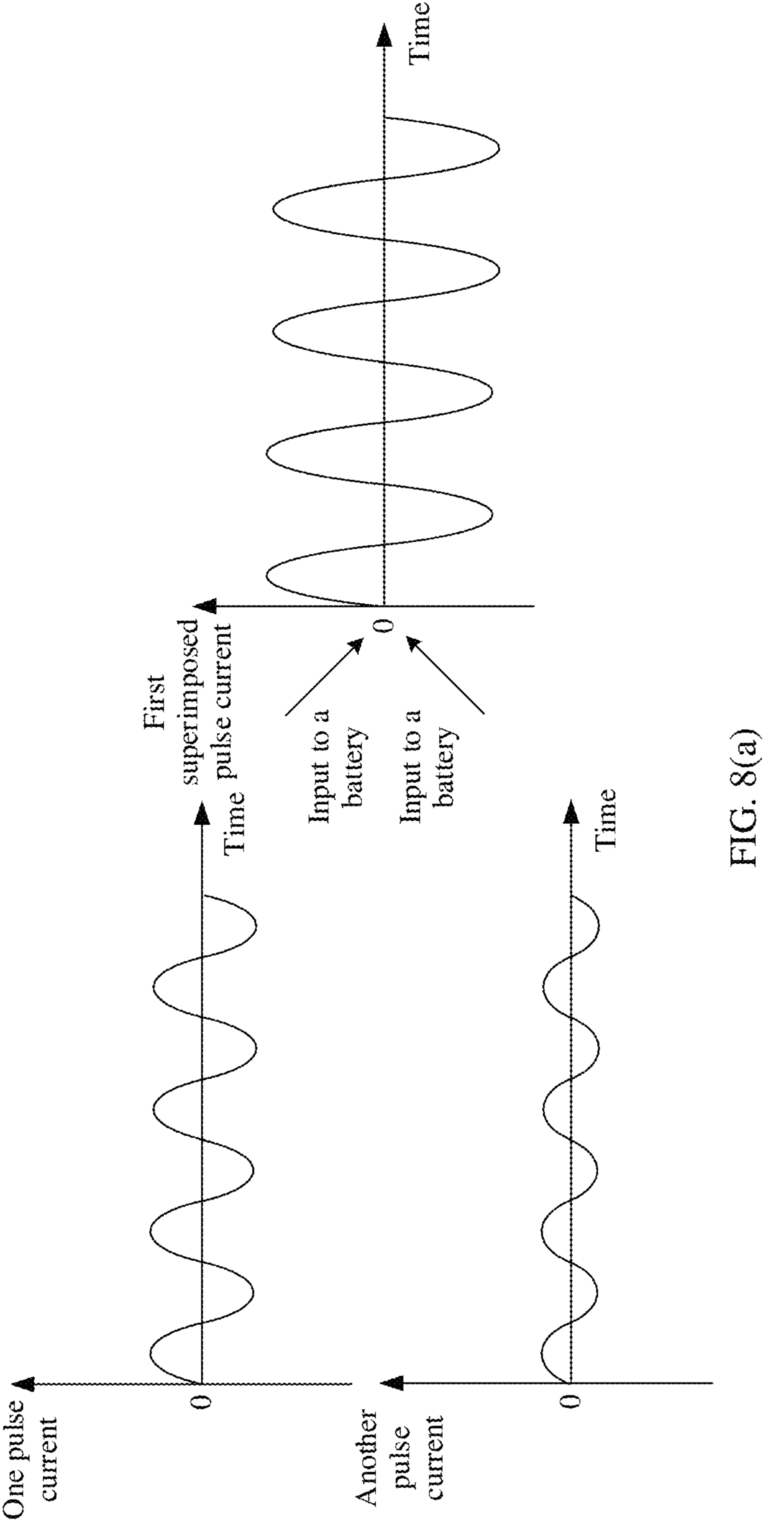
FIG. 8(*a*) to FIG. 8(*d*) are a diagram of superimposed pulse alternating currents of one pulse alternating current and another pulse alternating current input to a power battery.
Figure 8B:
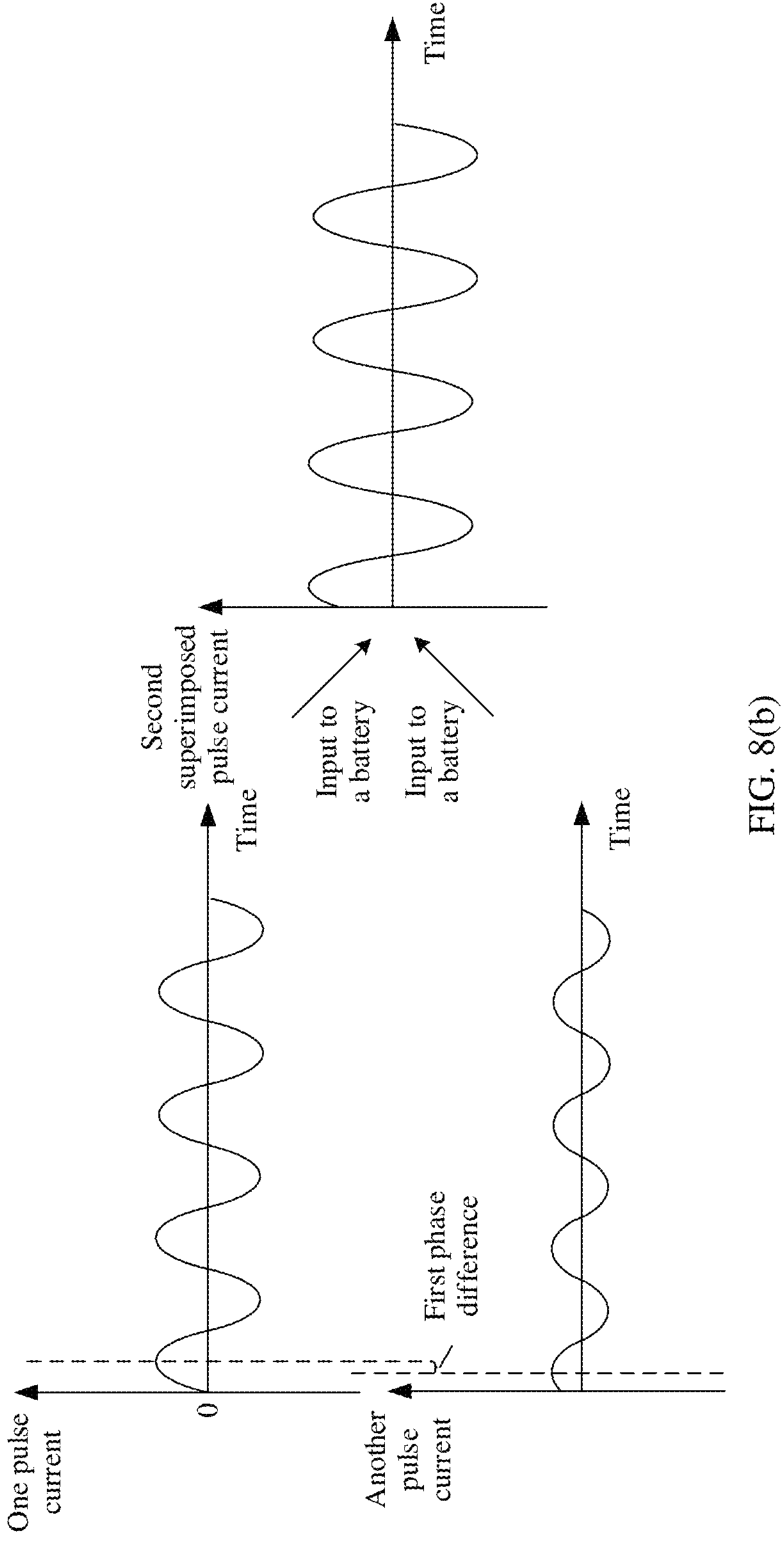
Figure 8C:
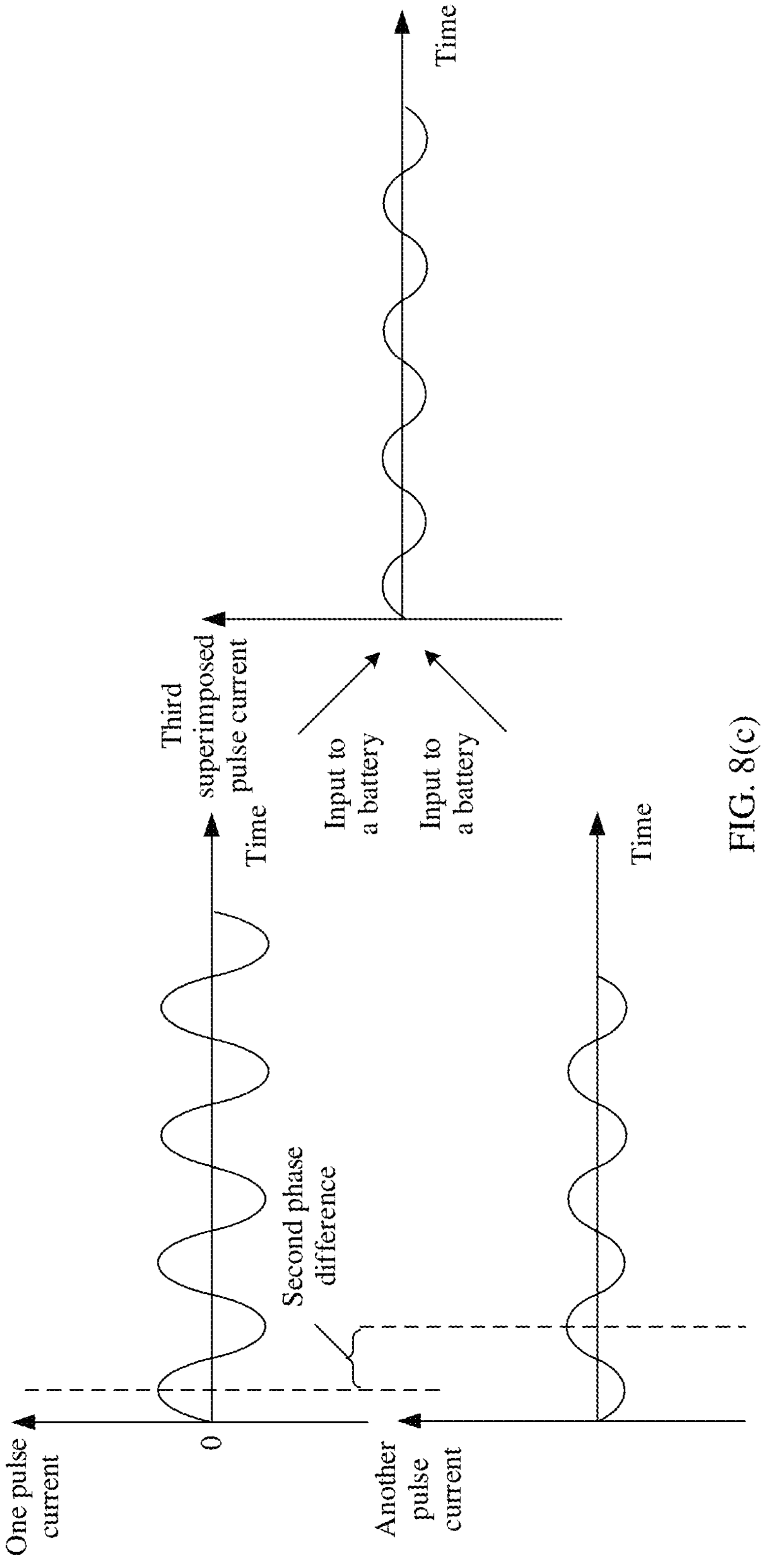
Figure 8D:
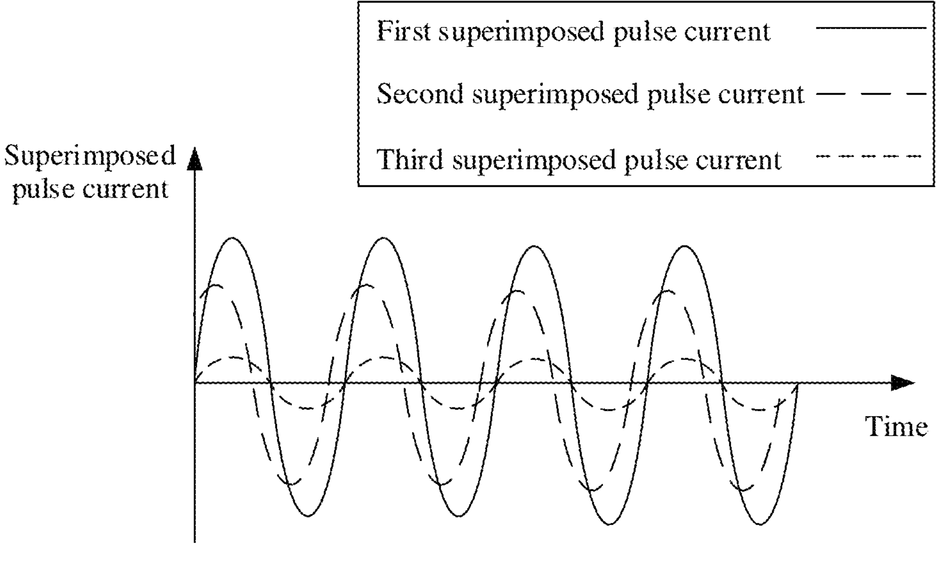

(a) in FIG. 7 is a waveform diagram of the first signal, (b) in FIG. 7 is a waveform diagram of the second signal, and (c) in FIG. 7 is a waveform diagram of a first-type signal to a fourth-type signal. An example in which a waveform of a voltage signal is a sine wave is used. That is, the signal in (c) in FIG. 7 is a combination of the first signal and the second signal.

Current signals of the direct axis current of the three-phase current of the first drive motor voltage given signal in any two adjacent periods are respectively any two of the first signal, the second signal, the signal formed by the positive half period of the first signal and the negative half period of the second signal, and the signal formed by the positive half period of the second signal and the negative half period of the first signal. Current signals of the direct axis current of the three-phase current of the second drive motor voltage given signal in any two adjacent periods are respectively the signal formed by the third signal, the fourth signal, the signal formed by the positive half period of the third signal and the negative half period of the fourth signal, and the signal formed by the positive half period of the fourth signal and the negative half period of the third signal.

In this way, after the four types of signals are preset, the first drive motor voltage given signal and the second drive motor voltage given signal may be randomly spliced in any two adjacent periods. Optionally, any two of the four types of signals are selected by using a random function (RAND) to complete combined splicing, so that frequencies of currents of each phase of the first three-phase current and frequencies of currents of the second three-phase current are different in any two adjacent periods.

It should be noted that the first drive motor voltage given signal and the second drive motor voltage given signal may further include more direct axis current signals with different frequencies. For example, if the first drive motor voltage given signal or the second drive motor voltage given signal includes N direct axis current signals with different frequencies, the N direct axis current signals with the different frequencies may be combined into 2N different types of signals, and current signals of the first drive motor voltage given signal or the second drive motor voltage given signal in any adjacent period include any two of the 2N types of signals.

Two power circuits are used to output a plurality of high frequency pulse alternating currents to heat the power battery 12 at the same time, and a heating rate may be increased. However, because there is a large phase difference between the pulse alternating currents flowing into the battery, the pulse alternating currents cancel each other, and therefore, the heating rate is affected. When the plurality of pulse alternating currents appear alternately, directions and intensity of the two pulse alternating currents may affect each other. If the two pulse alternating currents have opposite directions or amplitudes, the two pulse alternating currents cancel each other to some extent, and consequently, effect of a superimposed current is weakened. In embodiments, a phase difference between pulse alternating currents generated by the first power circuit 2031 and the second power circuit 2032 is further reduced, to improve heating efficiency of the power battery 12.

FIG. 8(*a*) to FIG. 8(*c*) are a diagram of superimposed pulse alternating currents of one pulse alternating current and another pulse alternating current input to the power battery 12. Refer to FIG. 8(*a*). When there is no phase difference between the two pulse alternating currents input to the power battery 12, the superimposed pulse alternating current input to the power battery 12 is a first superimposed pulse alternating current. Refer to FIG. 8(*b*). When there is a first phase difference between the two pulse alternating currents input to the power battery 12, the superimposed pulse alternating current input to the power battery 12 is a second superimposed pulse alternating current. Refer to FIG. 8(*c*). When there is a second phase difference between the two pulse alternating currents input to the power battery 12, the superimposed pulse alternating current input to the power battery 12 is a third superimposed pulse alternating current. FIG. 8(*d*) is a diagram of comparison of superimposed pulse alternating currents. When pulse alternating currents flowing into the power battery 12 have a large phase difference, a direction and intensity may affect each other. Because the heating power of the power battery 12 is positively correlated with the amplitude of the pulse alternating current, if the two pulse alternating currents have opposite directions or amplitudes (for example, a case of the third superimposed pulse alternating current), the two pulse alternating currents even cancel each other, thereby severely affecting heating efficiency of the power battery 12.

It can be understood from the foregoing that a problem of a phase difference between the pulse alternating currents needs to be resolved, so that the power battery 12 obtains high heating efficiency. In order to make the pulse alternating currents have a phase difference as small as possible, frequencies of the pulse alternating currents generated by the first power circuit 2031 and the second power circuit 2032 are generally the same. Even so, there are many reasons for the phase difference between the pulse alternating currents generated by the two power circuits. For example, when two power circuits input pulse alternating currents to the power battery 12, a phase delay is caused by a hardware condition, and because the phase delays are different, a phase difference exists between the pulse alternating currents. For another example, when control instructions are delivered to the two power circuits, because time points of delivering the instructions are different, a phase difference exists between the pulse alternating currents generated by the two power circuits.

Therefore, the phases of the pulse alternating currents generated by the two power circuits need to be monitored. When it is detected that a phase difference exists in the pulse alternating currents generated by the two power circuits, a pulse alternating current output by at least one of the two power circuits is adjusted, to reduce the phase difference between the pulse alternating currents generated by the two power circuits.

Because the phase of the current is difficult to detect, and has limited impact on heating efficiency, in a possible implementation, the control circuit is configured to: when the phase difference between the pulse alternating current generated by the first power circuit 2031 and the pulse alternating current generated by the second power circuit 2032 on the direct current bus is greater than a preset value, control a switching frequency of a switching transistor of the first power circuit 2031 or a switching frequency of a switching transistor of the second power circuit 2032, to reduce the phase difference between the pulse alternating current generated by the first power circuit 2031 and the pulse alternating current generated by the second power circuit 2032.

When a small phase difference exists between the pulse alternating currents generated by the power circuit, a direction and strength of the pulse alternating current flowing into the power battery 12 are not greatly affected. However, when the phase difference between the pulse alternating currents generated by the two power circuits is greater than the preset value, cancellation exists. Therefore, in this case, the phase difference of the pulse alternating currents output by the two power circuits can be reduced by adjusting the switching frequencies of the switching transistors in the two power circuits. For example, the preset value corresponding to the phase difference of the pulse alternating current may be 10°. It should be understood that a person skilled in the art may freely set the preset value based on measurement precision and heating efficiency. This is not limited herein.

In a possible implementation, in response to that the phase difference between the pulse alternating current generated by the first power circuit 2031 and the pulse alternating current generated by the second power circuit 2032 on the direct current bus is greater than the preset value, the switching frequency of the switching transistor of the first power circuit 2031 or the switching frequency of the switching transistor of the second power circuit 2032 is controlled, until the phase difference between the pulse alternating current generated by the first power circuit 2031 and the pulse alternating current generated by the second power circuit 2032 on the direct current bus is not greater than the preset value.

The switching frequency of the switching transistor of the first power circuit 2031 or the switching frequency of the switching transistor of the second power circuit 2032 is adjusted, so that the phase difference of the pulse alternating current generated by the first power circuit 2031 and the pulse alternating current generated by the second power circuit 2032 on the direct current bus is not greater than the preset value, thereby improving the heating efficiency of the power battery 12.

In a possible implementation, in response to that the phase difference between the pulse alternating current generated by the first power circuit 2031 and the pulse alternating current generated by the second power circuit 2032 on the direct current bus is not greater than the preset value, the switching frequency of the switching transistor of the first power circuit 2031 and the switching frequency of the switching transistor of the second power circuit 2032 is controlled to be the specified frequency.

After the switching frequency of the switching transistor of the first power circuit 2031 or the switching frequency of the switching transistor of the second power circuit 2032 is adjusted, if the phase difference between the pulse alternating current generated by the first power circuit 2031 and the pulse alternating current generated by the second power circuit 2032 on the direct current bus is not greater than the preset value, the switching frequency of the switching transistor of the first power circuit 2031 and the switching frequency of the switching transistor of the second power circuit 2032 may be controlled to be the specified frequency. In this way, the phase difference is avoided between the first power circuit 2031 and the second power circuit 2032 again.

A bridge arm midpoint of a three-phase bridge arm of each power circuit is configured to output a three-phase current, the three-phase current includes a U-phase current, a V-phase current, and a W-phase current, and the U-phase current, the V-phase current, and the W-phase current jointly form a pulse alternating current. Because frequencies of the three-phase current and the pulse alternating current are the same, whether the phase difference between the pulse alternating currents generated by the two power circuits is greater than the preset value may also be determined by detecting a phase difference of the in-phase currents corresponding to the two power circuits.

In a possible implementation, in a charging and discharging process of the power battery 12, bridge arm midpoints of three-phase bridge arms of the first power circuit 2031 and the second power circuit 2032 are configured to respectively output a three-phase current. The three-phase current is used to generate the pulse alternating current on the direct current bus, and the three-phase current includes a U-phase current, a V-phase current, and a W-phase current. The control circuit is configured to: in response to that a phase difference between the U-phase current, the V-phase current, or the W-phase current respectively output by the first power circuit 2031 and the second power circuit 2032 is greater than a preset value, adjust the switching frequency of the switching transistor of the first power circuit 2031 or the switching frequency of the switching transistor of the second power circuit 2032, to reduce a phase difference between the U-phase current, the V-phase current, and the W-phase current respectively output by the first power circuit 2031 and the second power circuit 2032.

A phase difference of a pulse alternating current generated by at least one power circuit may be reduced by adjusting a switching frequency of a switching transistor of at least one power circuit of the two power circuits. For example, a periodically turn-on frequency of an upper-bridge switching transistor of one bridge arm and periodically conduction frequencies lower-bridge switching transistors of the other two bridge arms of the three bridge arms of the at least one power circuit of the two power circuits are adjusted, or a periodically turn-on frequency of a lower-bridge switching transistor of one bridge arm and periodically conduction frequencies of upper-bridge switching transistors of the other two bridge arms of the three bridge arms of the two power circuits are adjusted, to reduce a phase difference between pulse alternating currents generated by the two power circuits, to improve heating efficiency of the power battery 12.

Bridge arm midpoints of the three-phase bridge arms of the first power circuit 2031 and the second power circuit 2032 are configured to separately output three-phase currents. The three-phase current includes a U-phase current, a V-phase current, and a W-phase current, and the U-phase current, the V-phase current, and the W-phase current jointly form a pulse alternating current. Because frequencies of the three-phase current and the pulse alternating current are the same, whether the phase difference between the pulse alternating currents generated by the two three-phase bridge arms is greater than the preset value may also be determined by detecting a phase difference of in-phase currents corresponding to any two three-phase bridge arms.

A phase difference between the pulse alternating current generated by the first power circuit 2031 and the pulse alternating current generated by the second power circuit 2032 may be reduced by adjusting the switching frequency of the switching transistor of the at least one three-phase bridge arm in the first power circuit 2031 and the second power circuit 2032. For example, a periodically turn-on frequency of an upper-bridge switching transistor of one bridge arm and periodically conduction frequencies lower-bridge switching transistors of the other two bridge arms of the at least one power circuit of the first power circuit 2031 and the second power circuit 2032 are adjusted, or a periodically turn-on frequency of a lower-bridge switching transistor of one bridge arm and periodically conduction frequencies of upper-bridge switching transistors of the other two bridge arms of the at least one power circuit of the first power circuit 2031 and the second power circuit 2032 are adjusted, to reduce the phase difference between the pulse alternating current generated by the first power circuit 2031 and the pulse alternating current generated by the second power circuit 2032, to improve heating efficiency of the power battery 12.

In a possible implementation, the control circuit is configured to: in response to that the phase difference between the U-phase current, the V-phase current, or the W-phase current respectively output by the first power circuit 2031 and the second power circuit 2032 is greater than the preset value, adjust the switching frequency of the switching transistor of the first power circuit 2031 or the switching frequency of the switching transistor of the second power circuit 2032, until the phase difference between the U-phase current, the V-phase current, or the W-phase current respectively output by the first power circuit 2031 and the second power circuit 2032 is not greater than the preset value.

The switching frequency of the switching transistor of the first power circuit 2031 or the switching frequency of the switching transistor of the second power circuit 2032 is adjusted, so that the phase difference between the U-phase current, the V-phase current, or the W-phase current output by the first power circuit 2031 and the second power circuit 2032 is not greater than the preset value, thereby improving the heating efficiency of the power battery 12.

In a possible implementation, the control circuit is configured to: in response to that the phase difference between the U-phase current, the V-phase current, or the W-phase current respectively output by the first power circuit 2031 and the second power circuit 2032 is not greater than the preset value, control the switching frequency of the switching transistor of the first power circuit 2031 and the switching frequency of the switching transistor of the second power circuit 2032 to be a specified frequency.

After the switching frequency of the switching transistor of the first power circuit 2031 or the switching frequency of the switching transistor of the second power circuit 2032 is adjusted, if the phase difference between the U-phase current, the V-phase current, or the W-phase current output by the first power circuit 2031 and the second power circuit 2032 is not greater than the preset value, the switching frequency of the switching transistor of the first power circuit 2031 and the switching frequency of the switching transistor of the second power circuit 2032 may be controlled to be the specified frequency. In this way, the phase difference is avoided between the first power circuit 2031 and the second power circuit 2032 again.

For a transmission delay problem caused by different transmission path lengths, even if a control signal is sent to power circuits corresponding to the first drive motor 201 and the second drive motor 202 and power circuits corresponding to another motor at the same moment by using a DSP-to-DSP hardware communication channel, a phase difference is generated in a pulse alternating current generated by the power circuits corresponding to the first drive motor 201 and the second drive motor 202 and the power circuits corresponding to the another motor. Therefore, as a possible implementation, in response to that the phase difference between the pulse alternating current generated by the first power circuit 2031 and the pulse alternating current generated by the second power circuit 2032 on the direct current bus is greater than the preset value, the first control signal may be first output to control power circuits corresponding to the first drive motor 201 and the second drive motor 202 to output a three-phase current, and then the second control signal is output to control power circuits corresponding to another motor to output the three-phase current. In this way, a problem caused by a transmission delay can be reduced, so that the phase difference output by the two power circuits is reduced, and heating efficiency of the power battery 12 is improved.

Figure 9A:
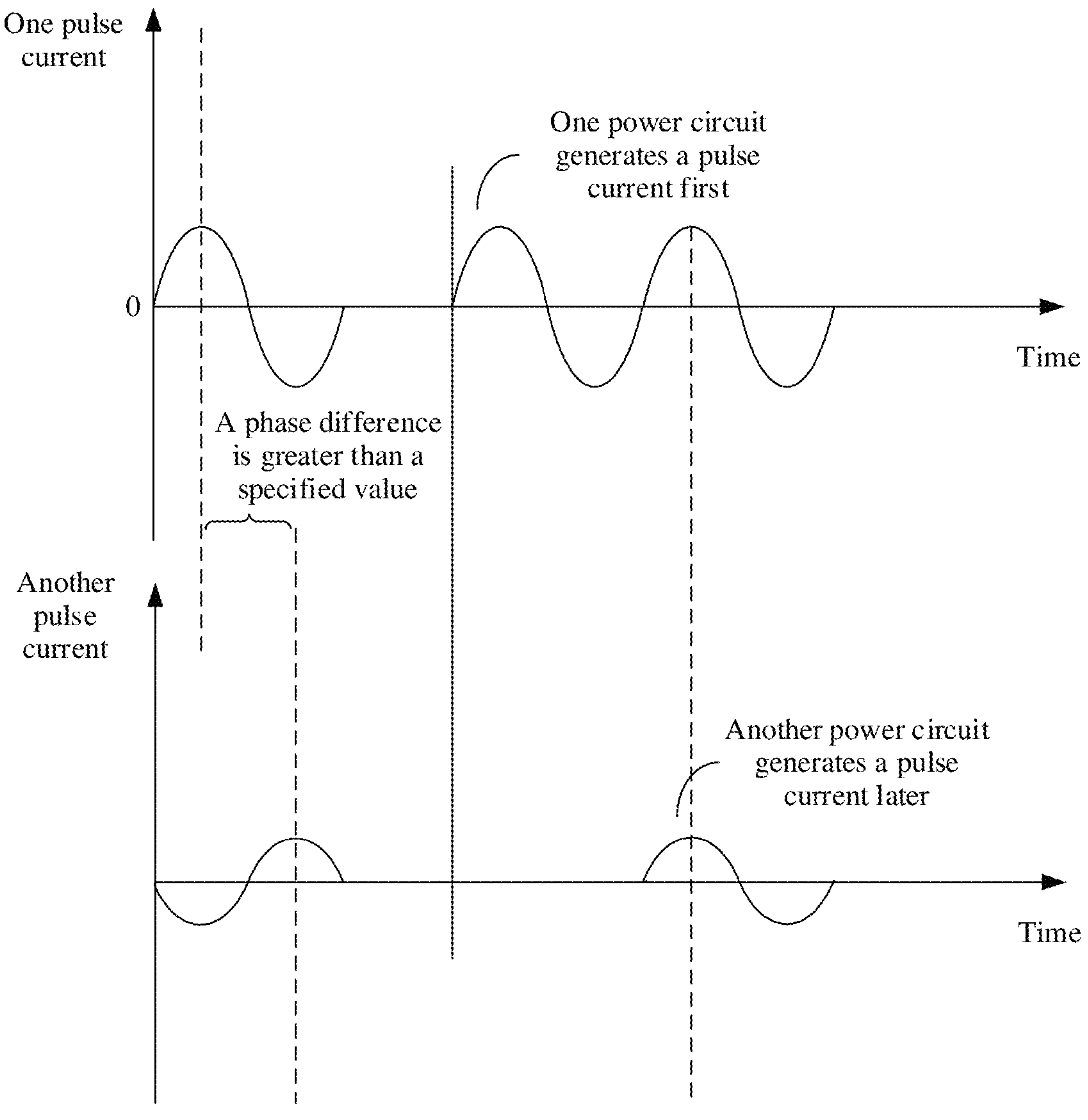
FIG. 9(*a*) and FIG. 9(*b*) are a diagram 2 of a pulse alternating current input to a power battery.
Figure 9B:
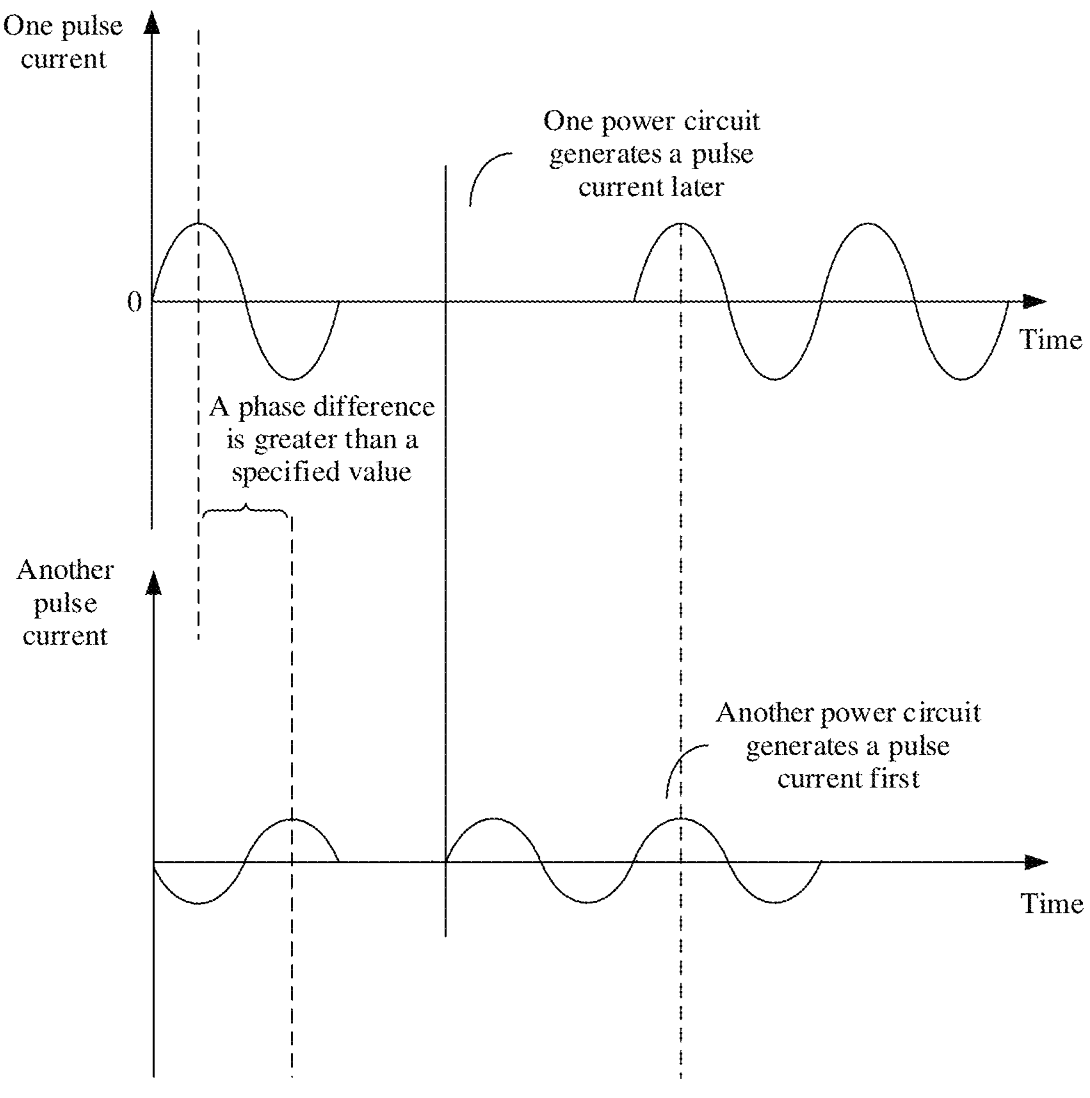

Refer to FIG. 9(*a*). If a phase difference between a pulse alternating current generated by one of the power circuits and a pulse alternating current generated by another power circuit is greater than a preset value, one of the power circuits may be controlled to generate the pulse alternating current first, and then the other power circuit is controlled to generate the pulse alternating current later. In this manner, the phase difference between the pulse alternating currents generated by two power circuits can be reduced, thereby improving heating efficiency of the power battery 12. Alternatively, refer to FIG. 9(*b*). One of the power circuits may be controlled to generate the pulse alternating current later, and the other power circuit may be controlled to generate the pulse alternating current first. In this way, the phase difference between the pulse alternating currents generated by the two power circuits may also be reduced, to improve heating efficiency of the power battery 12.

Figure 10:
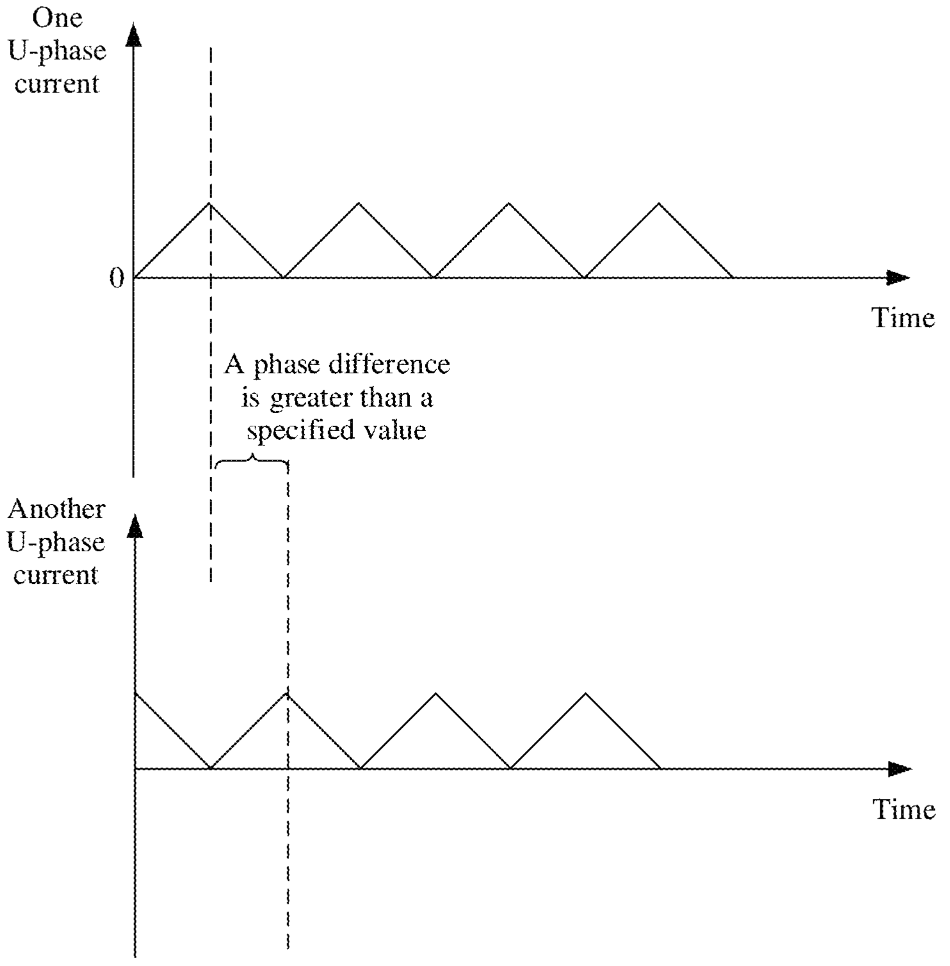
FIG. 10 is a diagram of a phase current.

FIG. 10 is a diagram of a phase current. For example, phases of U-phase currents output by two power circuits are compared. When a phase difference between the U-phase currents output by the two power circuits is greater than a preset value, switching frequencies of switching transistors in the two power circuits may be adjusted to reduce the phase difference between the U-phase currents output by the two power circuits.

Because the three-phase current is a current corresponding to windings of the first drive motor 201 and the second drive motor 202, when the current is output to direct axes of the first drive motor 201 and the second drive motor 202, the motor controller needs to transform the direct axis current into a three-phase current of a U-phase current, a V-phase current, and a W-phase current through inverse Park transformation, and conduct the U-phase current, the V-phase current, and the W-phase current into the motor winding.

Because a phase of the current is difficult to be detected, in response to that a current difference between the U-phase current, the V-phase current, and the W-phase current generated in the two power circuits at a same moment is greater than a preset value, switching frequencies of switching transistors in the two power circuits are adjusted to reduce the phase difference between the U-phase current, the V-phase current, and the W-phase current that are output by the two power circuits.

If amplitudes of the U-phase current, the V-phase current, and the W-phase current that are output by each power circuit are the same, preset values corresponding to the two power circuits may be the same. If amplitudes of the U-phase current, the V-phase current, and the W-phase current that are output by each power circuit are not completely the same, different preset values may be separately set.

If the amplitudes of the pulse alternating currents output by the two power circuits are the same, preset values corresponding to the two power circuits may be the same. If the amplitudes of the pulse alternating currents output by the two power circuits are not the same, different preset values may be separately set. A person skilled in the art may set different preset values based on different current differences corresponding to different phase differences. Details are not described herein again.

A direct axis current component of the three-phase current output by the power circuit is determined by a voltage given signal and a direct axis bias signal. Because the voltage given signal is used to indicate a frequency and an amplitude of a voltage, a frequency of the direct axis current component of the pulse alternating current may be adjusted by adjusting a frequency of the voltage given signal. When the phase difference between the pulse alternating currents generated by the first power circuit 2031 and the pulse alternating currents generated by the second power circuit 2032 is greater than the preset value, or the phase difference between the U-phase currents, the V-phase currents, or the W-phase currents output by the two power circuits is greater than the preset value, a function of adjusting phases of the U-phase currents, the V-phase currents, the W-phase currents, and the pulse alternating currents can be implemented by adjusting the frequency of the voltage given signal. In this way, the phase difference between the U-phase currents output by the two power circuits can be reduced, and heating efficiency of the power battery 12 can be improved.

Figure 11A:
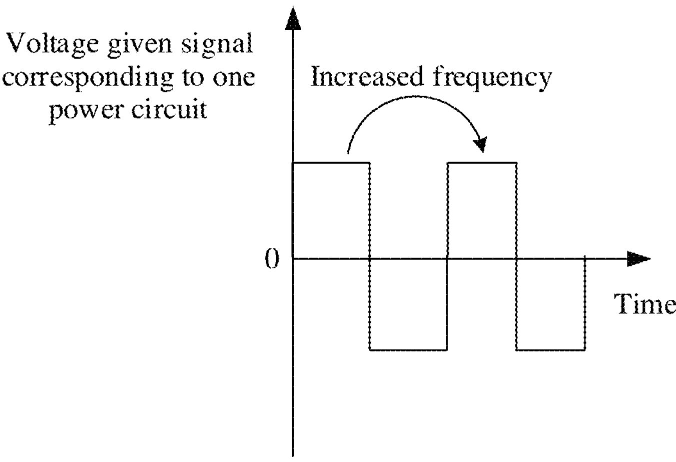
FIG. 11(*a*) and FIG. 11(*b*) are a schematic diagram 1 of a voltage given signal and a pulse alternating current.
Figure 11A:
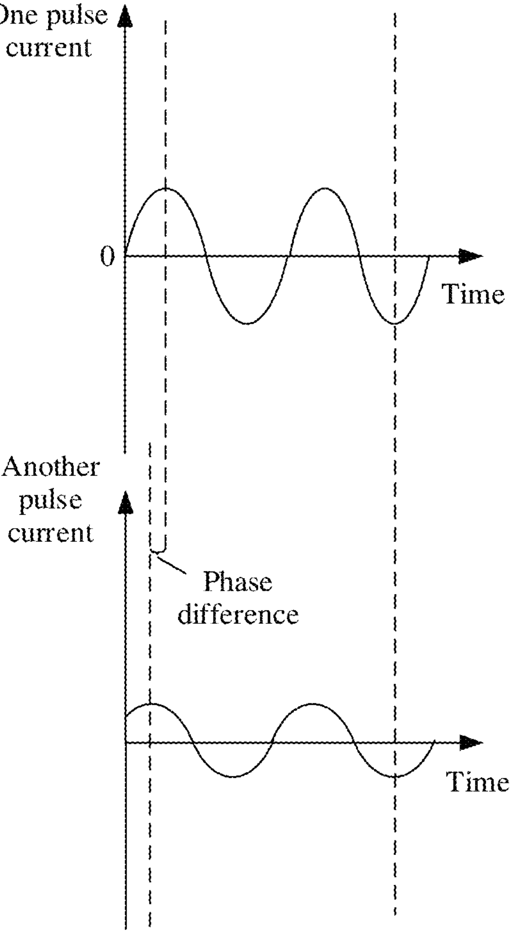
Figure 11B:
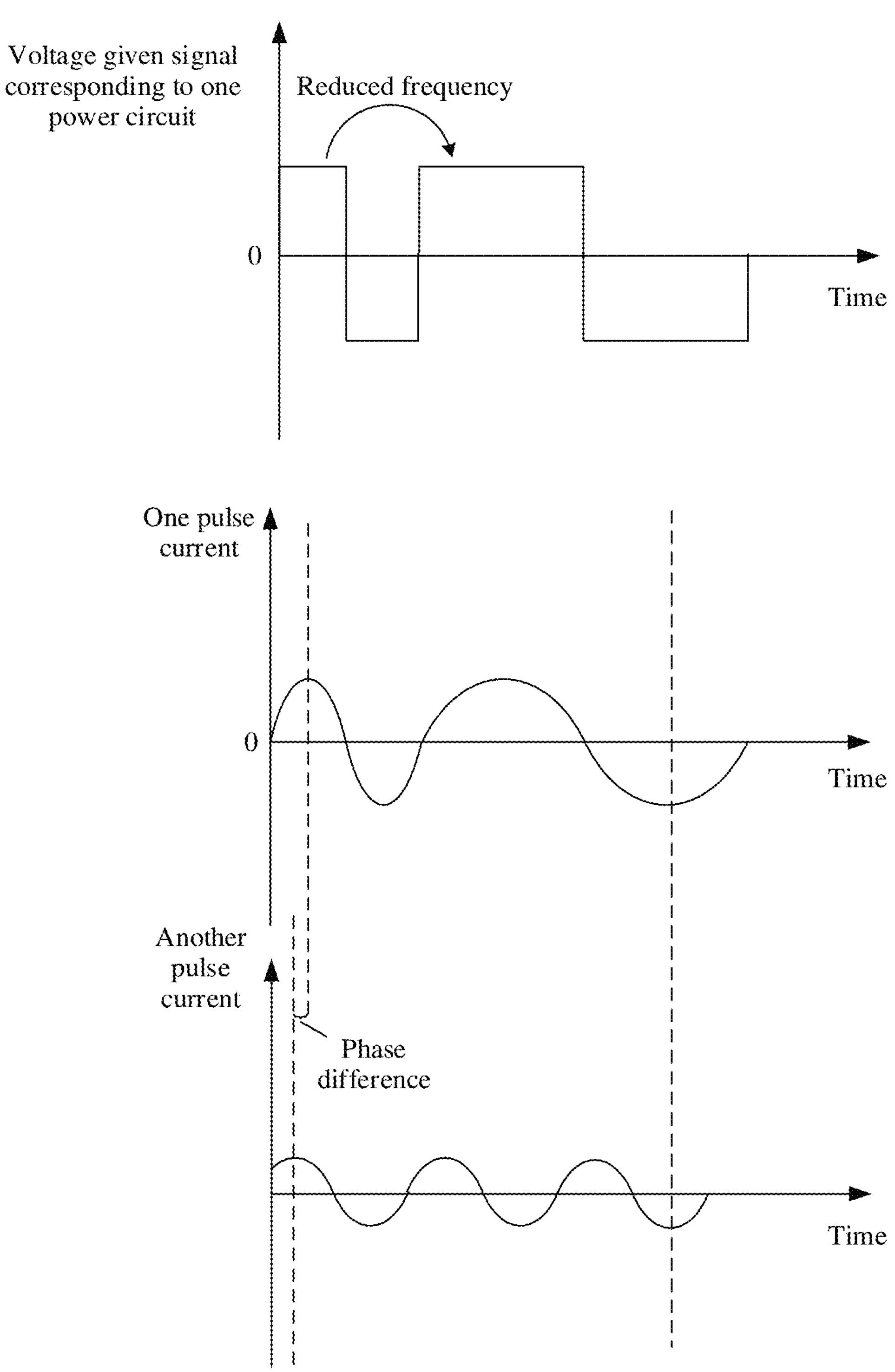

Refer to FIG. 11(*a*). When a phase difference exists between the two pulse alternating currents (or U, V, and W phase currents) that are input to the power battery 12, the frequency of the voltage indicated by the voltage given signal (the frequency of the direct axis current component of the three-phase current) corresponding to the voltage of one of the power circuits is increased, so that a frequency of a direct axis current component of a pulse alternating current generated by one of the power circuits can be increased, thereby reducing the phase difference between the pulse alternating currents generated by the two power circuits, and improving heating efficiency of the power battery 12. Refer to FIG. 11(*b*). When a phase difference exists between the two pulse alternating currents (or U, V, and W phase currents) that are input to the power battery 12, the frequency of the voltage indicated by the voltage given signal (the frequency of the direct axis current component of the three-phase current) corresponding to the voltage of one of the power circuits is decreased, so that a frequency of a direct axis current component of a pulse alternating current generated by one of the power circuits can be decreased, thereby reducing the phase difference between the pulse alternating currents generated by the two power circuits, and improving heating efficiency of the power battery 12. Similarly, a frequency of a voltage indicated by a voltage given signal corresponding to another power circuit is increased/decreased, so that a phase difference of a pulse alternating current generated by the two power circuits may also be decreased, thereby improving heating efficiency of the power battery 12. Details are not described herein again.

After the frequency of the voltage indicated by the voltage given signal corresponding to one/the another power circuit is increased/decreased, in order not to generate a phase difference again for the pulse alternating current subsequently generated by the two power circuits, in a possible implementation, the method includes: in response to that the phase difference between the pulse alternating currents generated by the two power circuits is less than or equal to a preset value and a phase difference between U-phase currents, V-phase currents, or W-phase currents output by the two power circuits is less than or equal to the preset value, controlling the frequency of the direct axis current component of a three-phase current output by each power circuit to be the preset frequency.

If the frequencies of the two pulse alternating currents are different, even if the phase difference between the pulse alternating currents generated by the two power circuits is less than or equal to the preset value in the period, the phase difference between the pulse alternating currents generated by the two power circuits is not less than or equal to the preset value in a next period. Therefore, once the phase difference between the pulse alternating currents generated by the two power circuits is less than or equal to the preset value, and the phase difference between the U-phase currents, the V-phase currents, or the W-phase currents output by the two power circuits is less than or equal to the preset value, frequencies of the direct axis current components of the three-phase current output by each power circuit may be controlled to be the preset frequency. The preset frequency may be a frequency of the direct axis current component before adjustment. In other words, after the phase difference between the pulse alternating currents generated by the two power circuits is less than or equal to the preset value, and the phase difference between the U-phase currents, the V-phase currents, or the W-phase currents output by the two power circuits is less than or equal to the preset value, it is ensured that the frequencies of the direct axis current components of the three-phase current output by each power circuit are the same.

Figure 12A:
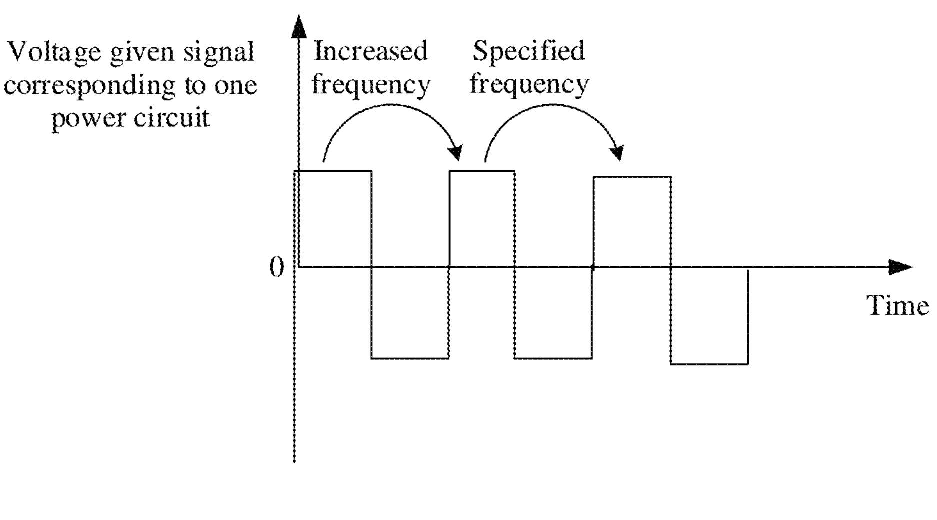
FIG. 12(*a*) and FIG. 12(*b*) are a schematic diagram 2 of a voltage given signal and a pulse alternating current.
Figure 12A:
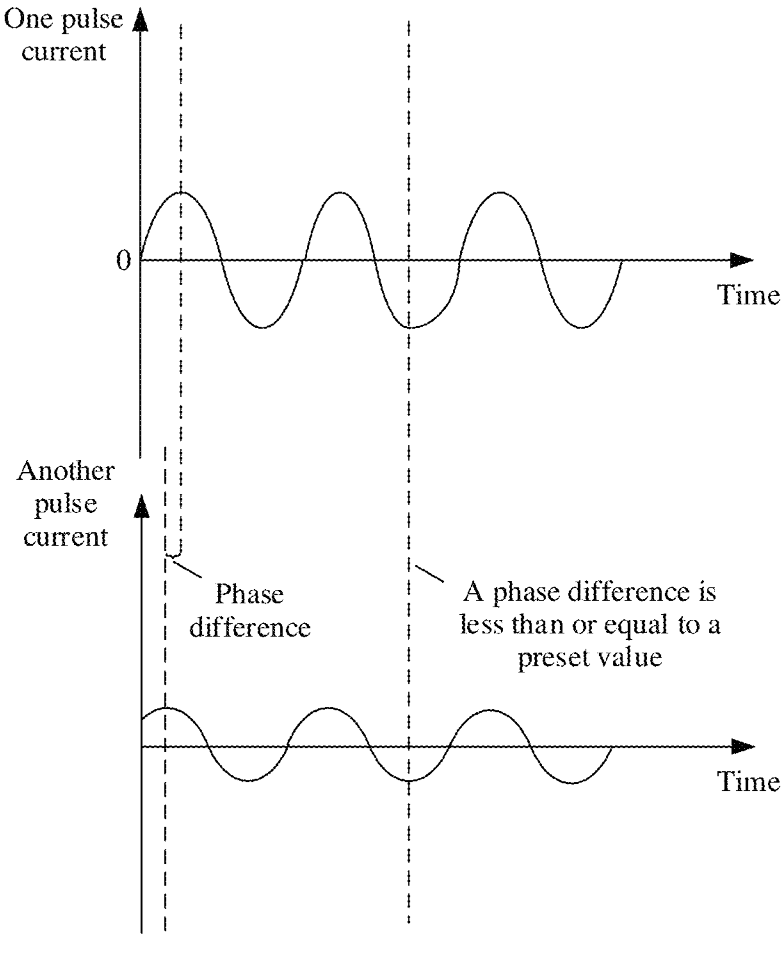
Figure 12B:
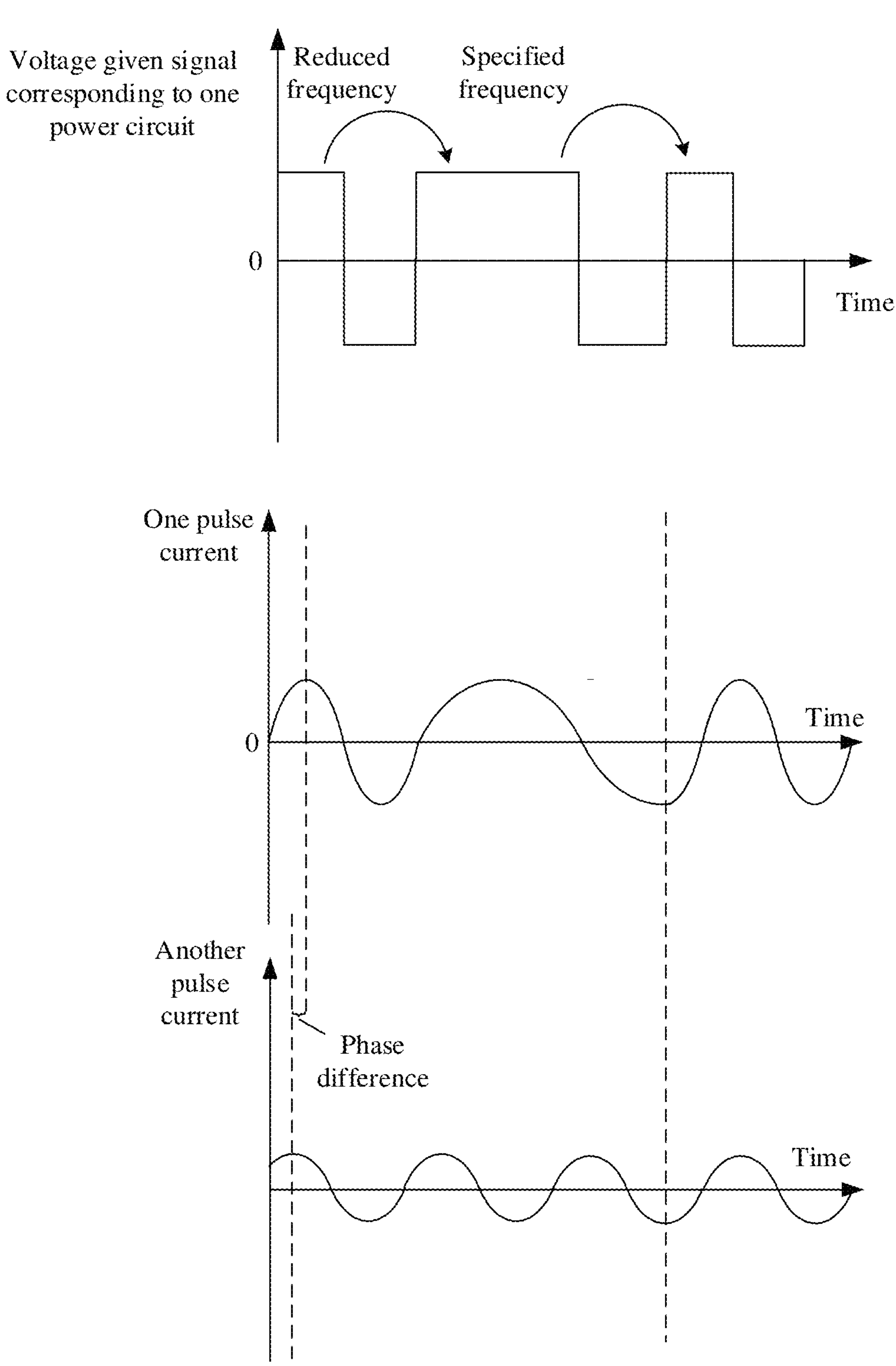

Refer to FIG. 12(*a*). When the phase difference exists between the two pulse alternating currents (or U, V, and W phase currents) that are input to the power battery 12, the frequency (a frequency of a direct axis current component of a three-phase current) of the voltage indicated by the voltage given signal corresponding to a voltage of one of the power circuits is increased, so that a frequency of a direct axis current component of a pulse alternating current generated by one of the power circuits can be increased, thereby reducing the phase difference between the pulse alternating currents generated by the two power circuits. In addition, when the phase difference between the two pulse alternating currents input to the power battery 12 is less than or equal to a preset value (the preset value in FIG. 12 is 0°), a frequency of a voltage indicated by a voltage given signal corresponding to one of the power circuits is adjusted, to control the frequencies of the direct axis current components of the three-phase current output by each power circuit to be the preset frequency, thereby avoiding a phase difference generated again by a subsequently generated pulse alternating current.

Refer to FIG. 12(*b*). When the phase difference exists between the two pulse alternating current (or U, V, and W phase currents) that are input to the power battery 12, the frequency (a frequency of a direct axis current component of a three-phase current) of the voltage indicated by the voltage given signal corresponding to a voltage of one of the power circuits is decreased, so that a frequency of a direct axis current component of a pulse alternating current generated by one of the power circuits can be decreased, thereby reducing the phase difference between the pulse alternating currents generated by the two power circuits. In addition, when the phase difference between the two pulse alternating currents input to the power battery 12 is less than or equal to a preset value, a frequency of a voltage indicated by a voltage given signal corresponding to one of the power circuits is adjusted, to control the frequencies of the direct axis current components of the three-phase current output by each power circuit to be the preset frequency. Similarly, after the frequency of the voltage indicated by the voltage given signal corresponding to the another power circuit is increased/reduced, if the phase difference between the pulse alternating currents generated by the two power circuits is less than or equal to the preset value again, the frequencies of the direct axis current components of the three-phase current output by each power circuit may be controlled to be the preset frequency, thereby avoiding the phase difference generated again by the subsequently generated pulse alternating current.

Figure 13:
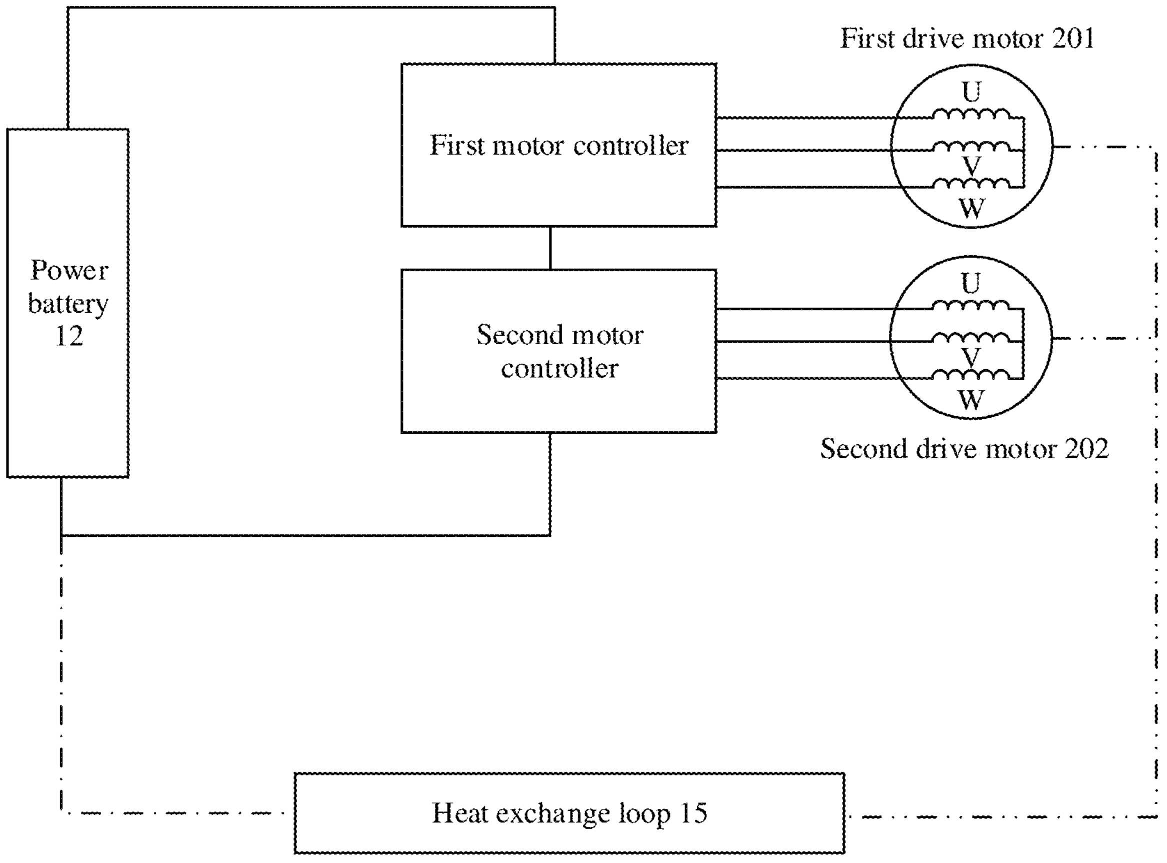
FIG. 13 is a diagram 1 of a structure of another electric vehicle according to an embodiment.

As shown in FIG. 13, the electric vehicle 10 provided in embodiments includes a heat exchange loop 15. Based on heat effect of the current, three-phase currents on a first drive motor 201 and a second drive motor 202 causes three-phase windings of the first drive motor 201 and the second drive motor 202 to heat up. The heat exchange loop is configured to transfer heat generated on the windings of the first drive motor 201 and the second drive motor 202 to a power battery 12, to transfer heat generated on motor windings in a pulse heating process of the power battery 12 to the power battery 12, thereby improving energy utilization efficiency, saving energy, and improving heating efficiency of the power battery 12.

Figure 14:
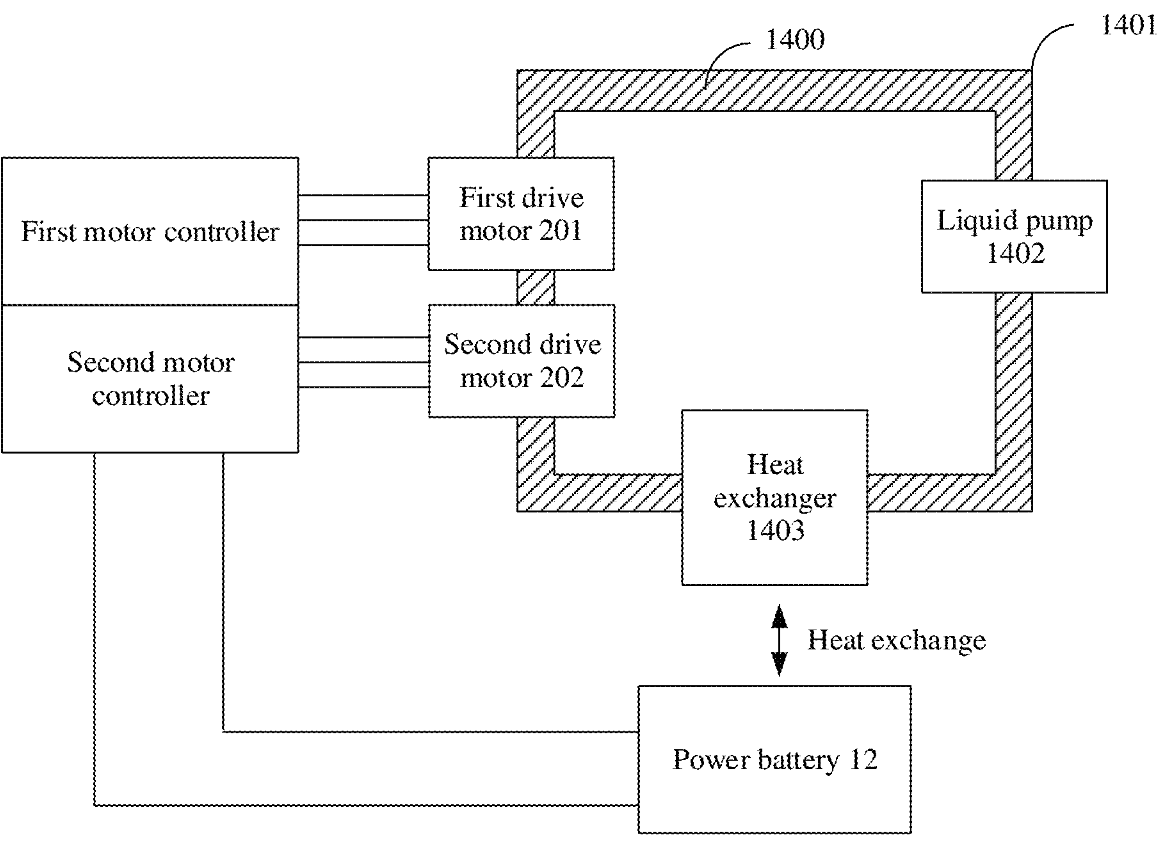
FIG. 14 is a diagram 2 of a structure of still another electric vehicle according to an embodiment.

In an embodiment, as shown in FIG. 14, the heat exchange loop includes a heat transfer medium 1400, a heat transfer medium flow loop 1401, a liquid pump 1402, and a heat exchanger 1403. The heat transfer medium is configured to absorb heat generated on the first drive motor 201 winding and the second drive motor 202 winding. The heat transfer medium flows in the heat transfer medium flow loop. The liquid pump 1402 is configured to provide power for the flow of the heat transfer medium. The heat exchanger 1403 is configured to absorb heat in the heat transfer medium and transfer the absorbed heat in the heat transfer medium to the power battery 12, to heat the power battery 12.

It is clear that a person skilled in the art can make various modifications and variations to the embodiments without departing from their spirit and scope. The embodiments are intended to cover these modifications and variations.

What is claimed is:

1. A method for pulse heating a power battery of an electric vehicle, wherein the electric vehicle comprises:

a first powertrain comprising a first motor controller and a first drive motor that is configured to be in transmission connection with two front wheels of the electric vehicle; and a second powertrain comprising a second motor controller and a second drive motor that is configured to be in transmission connection with two rear wheels of the electric vehicle, wherein the first motor controller comprises a first power circuit and a first bus capacitor, and the second motor controller comprises a second power circuit and a second bus capacitor; the first power circuit comprises a first three-phase bridge arm, two ends of each bridge arm of the first three-phase bridge arm are respectively configured to connect two ends of the first bus capacitor, the second power circuit comprises a second three-phase bridge arm, two ends of each bridge arm of the second three-phase bridge arm are respectively configured to connect two ends of the second bus capacitor, and the two ends of the first bus capacitor and the two ends of the second bus capacitor are separately configured to connect a positive electrode and a negative electrode of a power battery through a direct current bus, and the method comprises:

after a temperature of the power battery is less than a first preset temperature, controlling one of the first power circuit and the second power circuit to output a three-phase current; and after the temperature of the power battery is less than a second preset temperature, controlling both the first power circuit and the second power circuit to output the three-phase current, wherein the second preset temperature is less than the first preset temperature;

after a phase difference between a pulse alternating current generated by the first power circuit and a pulse alternating current generated by the second power circuit is greater than a preset value, adjusting a switching frequency of a switching transistor of the first power circuit or a switching frequency of a switching transistor of the second power circuit to reduce the phase difference between the pulse alternating current output by the first power circuit and the pulse alternating current output by the second power circuit; and the three-phase current is used to generate a pulse alternating current on the direct current bus, and the pulse alternating current is used to heat the power battery.

2. The method according to claim 1, wherein the method further comprises:

controlling the first power circuit to generate the pulse alternating current first and controlling the second power circuit to generate the pulse alternating current later; or controlling the second power circuit to generate the pulse alternating current first and controlling the first power circuit to generate the pulse alternating current later.

3. The method according to claim 1, wherein the three-phase current comprises a U-phase current, a V-phase current, and a W-phase current, and the method further comprises:

after a phase difference between the U-phase current, the V-phase current, or the W-phase current respectively output by the first power circuit and the second power circuit is greater than a preset value, adjusting the switching frequency of the switching transistor of the first power circuit or the switching frequency of the switching transistor of the second power circuit, to reduce a phase difference between the U-phase current, the V-phase current, and the W-phase current respectively output by the first power circuit and the second power circuit.

4. The method according to claim 3, wherein the method further comprises:

after phase difference between the U-phase current, the V-phase current, or the W-phase current respectively output by the first power circuit and the second power circuit is less than or equal to the preset value, controlling the switching frequency of the switching transistor of the first power circuit and the switching frequency of the switching transistor of the second power circuit to be a specified frequency.

5. The method according to claim 1, wherein the method further comprises:

after the phase difference between the pulse alternating current generated by the first power circuit and the pulse alternating current generated by the second power circuit on the direct current bus is greater than the preset value, adjusting the switching frequency of the switching transistor of the first power circuit or the switching frequency of the switching transistor of the second power circuit, to reduce a phase difference between pulse alternating currents generated by the any two power circuits.

6. The method according to claim 5, wherein the method further comprises:

after the phase difference between the pulse alternating current generated by the first power circuit and the pulse alternating current generated by the second power circuit on the direct current bus is greater than the preset value, controlling the switching frequency of the switching transistor of the first power circuit or the switching frequency of the switching transistor of the second power circuit until the phase difference between the pulse alternating current generated by the first power circuit and the pulse alternating current generated by the second power circuit on the direct current bus is not greater than the preset value.

7. The method according to claim 5, wherein the method further comprises:

after the phase difference between the pulse alternating current generated by the first power circuit and the pulse alternating current generated by the second power circuit on the direct current bus is less than or equal to the preset value, controlling the switching frequency of the switching transistor of the first power circuit and the switching frequency of the switching transistor of the second power circuit to be the specified frequency.

8. The method according to claim 1, wherein the three-phase current output by the first power circuit is a first three-phase current, the three-phase current output by the second power circuit is a second three-phase current, and the method further comprises:

controlling a current of each phase of the first three-phase current to have different frequencies in any two adjacent periods, and controlling a current of each phase of the second three-phase current to have different frequencies in any two adjacent periods.

9. The method according to claim 8, wherein the method further comprises:

controlling the current of each phase of the first three-phase current and the current of each phase of the second three-phase current to have different frequencies in a first half period and a second half period in a same period.

10. The method according to claim 8, wherein the method further comprises:

controlling waveforms of the current of each phase of the first three-phase current and the current of each phase of the second three-phase current to be single-sided triangular waves.

11. The method according to claim 8, wherein the method further comprises:

controlling waveforms of a direct axis voltage of the first three-phase current and a direct axis voltage of the second three-phase current to be square waves with a direct current bias.

12. The method according to claim 8, wherein the method further comprises:

controlling a quadrature axis component of the first three-phase current and a quadrature axis component of the second three-phase current to be zero.

13. An electric vehicle comprising:

a power battery, two front wheels, two rear wheels, a first powertrain comprising a first motor controller and a first drive motor that is configured to be in transmission connection with the two front wheels of the electric vehicle;

a second powertrain comprises a second motor controller and a second drive motor that is configured to be in transmission connection with the two rear wheels of the electric vehicle; and a vehicle controller, wherein the first motor controller comprises a first power circuit and a first bus capacitor, the second motor controller comprises a second power circuit and a second bus capacitor, the first power circuit comprises a first three-phase bridge arm, two ends of each bridge arm of the first three-phase bridge arm are respectively configured to connect two ends of the first bus capacitor, the second power circuit comprises a second three-phase bridge arm, two ends of each bridge arm of the second three-phase bridge arm are respectively configured to connect two ends of the second bus capacitor, the two ends of the first bus capacitor and the two ends of the second bus capacitor are separately configured to connect a positive electrode and a negative electrode of a power battery through a direct current bus; and the vehicle controller is configured to:

after a temperature of the power battery is less than a first preset temperature, control one of the first power circuit and the second power circuit to output a three-phase current; and after the temperature of the power battery is less than a second preset temperature, control both the first power circuit and the second power circuit to output the three-phase current, wherein the second preset temperature is less than the first preset temperature;

after a phase difference between a pulse alternating current generated by the first power circuit and a pulse alternating current generated by the second power circuit is greater than a preset value, adjust a switching frequency of a switching transistor of the first power circuit or a switching frequency of a switching transistor of the second power circuit to reduce the phase difference between the pulse alternating current output by the first power circuit and the pulse alternating current output by the second power circuit; and the three-phase current is used to generate a pulse alternating current on the direct current bus, and the pulse alternating current is used to heat the power battery.

14. The electric vehicle according to claim 13, wherein the vehicle controller is further configured to:

control the first power circuit to generate the pulse alternating current first and controlling the second power circuit to generate the pulse alternating current later; or control the second power circuit to generate the pulse alternating current first and controlling the first power circuit to generate the pulse alternating current later.

15. The electric vehicle according to claim 13, wherein the three-phase current comprises a U-phase current, a V-phase current, and a W-phase current, and the vehicle controller is further configured to:

after a phase difference between the U-phase current, the V-phase current, or the W-phase current respectively output by the first power circuit and the second power circuit is greater than a preset value, adjust the switching frequency of the switching transistor of the first power circuit or the switching frequency of the switching transistor of the second power circuit, to reduce a phase difference between the U-phase current, the V-phase current, and the W-phase current respectively output by the first power circuit and the second power circuit.

16. The electric vehicle according to claim 15, wherein the vehicle controller is further configured to:

after the phase difference between the U-phase current, the V-phase current, or the W-phase current respectively output by the first power circuit and the second power circuit is less than or equal to the preset value, control the switching frequency of the switching transistor of the first power circuit and the switching frequency of the switching transistor of the second power circuit to be a specified frequency.

17. The electric vehicle according to claim 13, wherein the vehicle controller is further configured to:

after the phase difference between the pulse alternating current generated by the first power circuit and the pulse alternating current generated by the second power circuit on the direct current bus is greater than the preset value, adjust the switching frequency of the switching transistor of the first power circuit or the switching frequency of the switching transistor of the second power circuit, to reduce a phase difference between pulse alternating currents generated by the any two power circuits.

* * * * *